United States Patent
Flider et al.

(10) Patent No.: US 11,321,381 B2
(45) Date of Patent: May 3, 2022

(54) PRESENTATION FEATURES FOR PERFORMING OPERATIONS AND SELECTING CONTENT

(71) Applicant: Apple Inc., Cupertino, CA (US)

(72) Inventors: Mark J. Flider, Mountain View, CA (US); James E. Tilton, Portland, OR (US); Haroon S. Sheikh, Longwood, FL (US); David A. Underwood, Vancouver (CA); Jonathan Cho, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/165,450

(22) Filed: Feb. 2, 2021

(65) Prior Publication Data

US 2021/0397641 A1 Dec. 23, 2021

Related U.S. Application Data

(60) Provisional application No. 63/048,853, filed on Jul. 7, 2020, provisional application No. 63/043,064, filed on Jun. 23, 2020.

(51) Int. Cl.
*G06F 16/438* (2019.01)
*G06T 13/80* (2011.01)
*G06F 16/483* (2019.01)

(52) U.S. Cl.
CPC ........ *G06F 16/4393* (2019.01); *G06F 16/483* (2019.01); *G06T 13/80* (2013.01)

(58) Field of Classification Search
CPC .... G06F 16/4393; G06F 16/483; G06T 13/80
See application file for complete search history.

(56) References Cited

U.S. PATENT DOCUMENTS

| | | | | |
|---|---|---|---|---|
| 8,694,889 | B2* | 4/2014 | Tilton | G06F 16/4393 |
| | | | | 715/732 |
| 9,576,386 | B2* | 2/2017 | Zhao | G06T 13/00 |
| 10,311,130 | B1* | 6/2019 | Kumar | G06T 11/60 |
| 2006/0288389 | A1* | 12/2006 | Deutscher | H04N 21/4828 |
| | | | | 725/88 |
| 2009/0049385 | A1* | 2/2009 | Blinnikka | G06F 3/0481 |
| | | | | 715/719 |
| 2015/0007034 | A1* | 1/2015 | Xu | G06F 3/0484 |
| | | | | 715/730 |
| 2015/0113368 | A1* | 4/2015 | Flider | G06T 13/80 |
| | | | | 715/203 |
| 2016/0267700 | A1* | 9/2016 | Huang | G06F 40/166 |
| 2017/0039867 | A1* | 2/2017 | Fieldman | G09B 5/10 |

\* cited by examiner

*Primary Examiner* — Dino Kujundzic
(74) *Attorney, Agent, or Firm* — Blank Rome LLP

(57) ABSTRACT

The present disclosure generally relates to techniques for presenting operations in a presentation. A technique is provided for allowing a user to insert media items on consecutive slides. During a presentation mode, the media items are determined to be two instances of a same media item, and matched such that the media item plays continuously across multiple slides. Another technique is provided to allow a user to utilize a user input to override a linearly-defined set of actions within a presentation. Another technique is utilized to temporarily select a visually obstructed object in a graphic editing interface such that the visually obstructed object may be manipulated during the temporary selection mode.

20 Claims, 23 Drawing Sheets

PRESENTATION FEATURES FOR PERFORMING OPERATIONS AND SELECTING CONTENT

FIELD

The present disclosure relates generally to computer user interfaces, and more specifically to features for performing operations in a presentation and selecting visually obstructed objects in a graphic editing interface.

BACKGROUND

Presentation applications allow users to create and present graphical slideshows. Typically, in an editing mode, a user generates a set of slides and inserts content, such as visual data, text, and the like. In a presentation mode, a user may load the generated slideshow and present the slideshow to an audience, walking through a set of slides. Some presentation applications allow a user to generate the slideshow in a linear fashion, such that slides and their content are presented in a linear fashion based on user input. For example, as a user presents a slideshow, the various slides and actions within the slides may be presented sequentially in a predetermined order as provided by the user during the editing mode. In addition, present applications allow users to create graphics that include multiple layered objects. However, when editing layered objects, difficulties arise. For example, it is often not intuitive or efficient to manipulate an object that is visually obstructed by another object.

BRIEF SUMMARY

Some techniques for performing operations in a presentation using electronic devices can be cumbersome. For example, components are typically tied to a single slide and are not typically presentable over multiple slides. Some existing techniques use a complex and time-consuming user interface, which may include multiple key presses or keystrokes. Existing techniques require substantial time, wasting user time and device energy. This latter consideration is particularly important in battery-operated devices.

Accordingly, the present technique provides electronic devices with faster, more efficient methods and interfaces for performing operations in preparation and display of slideshow presentations. Such methods and interfaces optionally complement or replace other methods for performing operations in slideshow presentations. Such methods and interfaces reduce the cognitive burden on a user and produce a more efficient human-machine interface. For battery-operated computing devices, such methods and interfaces conserve power and increase the time between battery charges.

Further, some techniques for editing visually obstructed objects in a graphic editing interface using electronic devices are generally cumbersome. For example, often many keystrokes are required to select and edit an object that is visually obstructed by another object. Some existing techniques use a complex and time-consuming user interface, which may include multiple key presses or keystrokes. Existing techniques require more time than necessary, wasting user time and device energy. This latter consideration is particularly important in battery-operated devices.

Accordingly, the present technique provides electronic devices with faster, more efficient methods and interfaces for performing selection operations in a graphic editing interface. Such methods and interfaces optionally complement or replace other methods for performing operations in slideshow presentations. Such methods and interfaces reduce the cognitive burden on a user and produce a more efficient human-machine interface. For battery-operated computing devices, such methods and interfaces conserve power and increase the time between battery charges.

A first method comprises, at an electronic device in communication with a display, receiving a slideshow comprising a first slide and a second slide, wherein the first slide comprises a first playable media item, and the second slide comprises a second playable media item; and in accordance with a determination that the first playable media item and the second playable item correspond to a same media item, modifying a presentation of the second playable media item during playback such that the same media item is played continuously during presentation of the first slide and the second slide. A non-transitory computer-readable storage medium storing one or more programs configured to be executed by one or more processors of an electronic device with a display, the one or more programs including instructions for performing the method. An electronic device, comprising a display, one or more input devices, one or more processors, and memory storing one or more programs configured to be executed by the one or more processors, the one or more programs including instructions for performing the method.

An electronic device comprising a display, one or more input devices, and means for performing the method.

A non-transitory computer-readable storage medium storing one or more programs configured to be executed by one or more processors of an electronic device with a display and a touch-sensitive surface, the one or more programs including instructions for, receiving a slideshow comprising a first slide and a second slide, wherein the first slide comprises a first playable media item, and the second slide comprises a second playable media item; and in accordance with a determination that the first playable media item and the second playable item correspond to a same media item, modifying a presentation of the second playable media item during playback such that the same media item is played continuously during presentation of the first slide and the second slide.

A transitory computer-readable storage medium storing one or more programs configured to be executed by one or more processors of an electronic device with a display, the one or more programs including instructions for, receiving a slideshow comprising a first slide and a second slide, wherein the first slide comprises a first playable media item, and the second slide comprises a second playable media item; and in accordance with a determination that the first playable media item and the second playable item correspond to a same media item, modifying a presentation of the second playable media item during playback such that the same media item is played continuously during presentation of the first slide and the second slide.

An electronic device comprising a display, one or more input devices, one or more processors, and memory storing one or more programs configured to be executed by the one or more processors, the one or more programs including instructions for receiving a slideshow comprising a first slide and a second slide, wherein the first slide comprises a first playable media item, and the second slide comprises a second playable media item, and in accordance with a determination that the first playable media item and the second playable item correspond to a same media item, modifying a presentation of the second playable media item during playback such that the same media item is played continuously during presentation of the first slide and the second slide.

An electronic device, comprising a display, one or more input devices, means for receiving a slideshow comprising a first slide and a second slide, wherein the first slide comprises a first playable media item, and the second slide comprises a second playable media item; and means for, in accordance with a determination that the first playable media item and the second playable item correspond to a same media item, modifying a presentation of the second playable media item during playback such that the same media item is played continuously during presentation of the first slide and the second slide.

A second method comprising at an electronic device in communication with a display and one or more input devices, displaying, via the display device, a first user interface of a slideshow application, wherein the first user interface includes a representation of a first slide of a slideshow, while displaying the first user interface, receiving, via the one or more input devices, first user input to add a first operation to the first slide of the slideshow, in response to the first user input, causing the first operation to be configured to be performed when one or more first criteria are met, receiving, via the one or more input devices, second user input to cause the slideshow to be presented, in response to the second user input, initiating presentation of the slideshow, and while presenting the slideshow, receiving, via the one or more input devices, third user input; and in response to the third user input, in accordance with a determination that one or more second criteria are met, utilizing one or more third criteria to determine initiation of the first operation, wherein the one or more second criteria are different from the one or more first criteria, the one or more third criteria are different from the one or more first criteria, and the one or more third criteria are different from the one or more second criteria.

A non-transitory computer-readable storage medium storing one or more programs configured to be executed by one or more processors of an electronic device with a display and one or more input devices, the one or more programs including instructions for performing the second method.

A transitory computer-readable storage medium storing one or more programs configured to be executed by one or more processors of an electronic device with a display and one or more input devices, the one or more programs including instructions for performing the second method.

An electronic device comprising, a display; one or more input devices; one or more processors; and memory storing one or more programs configured to be executed by the one or more processors, the one or more programs including instructions for performing the second method.

An electronic device comprising a display; one or more input devices; and means for performing the second method.

A non-transitory computer-readable storage medium storing one or more programs configured to be executed by one or more processors of an electronic device with a display and one or more user input devices, the one or more programs including instructions for displaying, via the display device, a first user interface of a slideshow application, wherein the first user interface includes a representation of a first slide of a slideshow; while displaying the first user interface, receiving, via the one or more input devices, first user input to add a first operation to the first slide of the slideshow; in response to the first user input, causing the first operation to be configured to be performed when one or more first criteria are met; receiving, via the one or more input devices, second user input to cause the slideshow to be presented; in response to the second user input, initiating presentation of the slideshow; and while presenting the slideshow, receiving, via the one or more input devices, third user input, and in response to the third user input, in accordance with a determination that one or more second criteria are met, utilizing one or more third criteria to determine initiation of the first operation, wherein the one or more second criteria are different from the one or more first criteria, the one or more third criteria are different from the one or more first criteria, and the one or more third criteria are different from the one or more second criteria.

An electronic device comprising a display; one or more input devices; one or more processors; and memory storing one or more programs configured to be executed by the one or more processors, the one or more programs including instructions for displaying, via the display device, a first user interface of a slideshow application, wherein the first user interface includes a representation of a first slide of a slideshow; while displaying the first user interface, receiving, via the one or more input devices, first user input to add a first operation to the first slide of the slideshow; in response to the first user input, causing the first operation to be configured to be performed when one or more first criteria are met; receiving, via the one or more input devices, second user input to cause the slideshow to be presented; in response to the second user input, initiating presentation of the slideshow; and while presenting the slideshow, receiving, via the one or more input devices, third user input; and in response to the third user input, in accordance with a determination that one or more second criteria are met, utilizing one or more third criteria to determine initiation of the first operation, wherein the one or more second criteria are different from the one or more first criteria, the one or more third criteria are different from the one or more first criteria, and the one or more third criteria are different from the one or more second criteria.

An electronic device comprising a display; one or more input devices; means for displaying, via the display device, a first user interface of a slideshow application, wherein the first user interface includes a representation of a first slide of a slideshow; means for receiving, while displaying the first user interface, via the one or more input devices, first user input to add a first operation to the first slide of the slideshow; means for causing, in response to the first user input, the first operation to be configured to be performed when one or more first criteria are met; means for receiving, via the one or more input devices, second user input to cause the slideshow to be presented; means for initiating, in response to the second user input, presentation of the slideshow; and means for receiving, while presenting the slideshow, via the one or more input devices, third user input; and means for utilizing, in response to the third user input and in accordance with a determination that one or more second criteria are met, one or more third criteria to determine initiation of the first operation, wherein the one or more second criteria are different from the one or more first criteria, the one or more third criteria are different from the one or more first criteria, and the one or more third criteria are different from the one or more second criteria.

A third method comprising, at an electronic device in communication with a display device, displaying, via the display device, a graphic editing interface comprising a plurality of layered objects and a selection component by which one or more of the plurality of layered objects may be selected, wherein the plurality of layered objects comprises a first object and a second object, while displaying the graphic editing interface, receiving, via one or more input devices, first user input, in response to the first user input, in accordance with a determination that the first user input corresponds to selection of the second object within the selection component, transitioning into a temporary selection mode, and selecting the second object, receiving, via the one or more input devices, second user input directed to a first location where the second object is at least partially visually obstructed by the first object when the second user input is received, wherein the second user input corresponds to a request to perform a first operation on an object at the first location, and in response to the second user input, in accordance with a determination that one or more first criteria are satisfied, performing the second operation on the second object, and receiving, via the one or more input devices, third user input directed to a second location where the second object is at least partially visually obstructed by the first object when the third user input is received, and in response to the third user input, in accordance with a determination that one or more second criteria are satisfied, performing the second operation on the first object.

An electronic device comprising, a display, one or more input devices, one or more processors, and memory storing one or more programs configured to be executed by the one or more processors, the one or more programs including instructions for performing the third method.

An electronic device comprising a display, one or more input devices, and means for performing the third method.

A non-transitory computer-readable storage medium storing one or more programs configured to be executed by one or more processors of an electronic device with a display, the one or more programs including instructions for displaying, via the display device, a graphic editing interface comprising a plurality of layered objects and a selection component by which one or more of the plurality of layered objects may be selected, wherein the plurality of layered objects comprises a first object and a second object, while displaying the graphic editing interface, receiving, via one or more input devices, first user input, in response to the first user input, in accordance with a determination that the first user input corresponds to selection of the second object within the selection component, transitioning into a temporary selection mode, and selecting the second object, receiving, via the one or more input devices, second user input directed to a first location where the second object is at least partially visually obstructed by the first object when the second user input is received, wherein the second user input corresponds to a request to perform a first operation on an object at the first location, and in response to the second user input, in accordance with a determination that one or more first criteria are satisfied, performing the second operation on the second object, and receiving, via the one or more input devices, third user input directed to a second location where the second object is at least partially visually obstructed by the first object when the third user input is received, and in response to the third user input, in accordance with a determination that one or more second criteria are satisfied, performing the second operation on the first object.

An electronic device comprising a display, one or more input devices, one or more processors, and memory storing one or more programs configured to be executed by the one or more processors, the one or more programs including instructions for displaying, via the display device, a graphic editing interface comprising a plurality of layered objects and a selection component by which one or more of the plurality of layered objects may be selected, wherein the plurality of layered objects comprises a first object and a second object, while displaying the graphic editing interface, receiving, via one or more input devices, first user input, in response to the first user input, in accordance with a determination that the first user input corresponds to selection of the second object within the selection component, transitioning into a temporary selection mode, and selecting the second object, receiving, via the one or more input devices, second user input directed to a first location where the second object is at least partially visually obstructed by the first object when the second user input is received, wherein the second user input corresponds to a request to perform a first operation on an object at the first location, and in response to the second user input, in accordance with a determination that one or more first criteria are satisfied, performing the second operation on the second object, and receiving, via the one or more input devices, third user input directed to a second location where the second object is at least partially visually obstructed by the first object when the third user input is received, and in response to the third user input, in accordance with a determination that one or more second criteria are satisfied, performing the second operation on the first object.

An electronic device comprising a display, one or more input devices, means for displaying, via the display device, a graphic editing interface comprising a plurality of layered objects and a selection component by which one or more of the plurality of layered objects may be selected, wherein the plurality of layered objects comprises a first object and a second object, means for, while displaying the graphic editing interface, receiving, via one or more input devices, first user input, in response to the first user input, in accordance with a determination that the first user input corresponds to selection of the second object within the selection component, transitioning into a temporary selection mode, and selecting the second object, means for receiving, via the one or more input devices, second user input directed to a first location where the second object is at least partially visually obstructed by the first object when the second user input is received, wherein the second user input corresponds to a request to perform a first operation on an object at the first location, and means for, in response to the second user input, in accordance with a determination that one or more first criteria are satisfied, performing the second operation on the second object, and means for receiving, via the one or more input devices, third user input directed to a second location where the second object is at least partially visually obstructed by the first object when the third user input is received, and means for, in response to the third user input, in accordance with a determination that one or more second criteria are satisfied, performing the second operation on the first object.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for managing event notifications, thereby increasing the effectiveness, efficiency, and user satisfaction with such devices. Such methods and interfaces may complement or replace other methods for managing event notifications.

DESCRIPTION OF THE FIGURES

For a better understanding of the various described embodiments, reference should be made to the Description of Embodiments below, in conjunction with the following drawings in which like reference numerals refer to corresponding parts throughout the figures.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for presentation applications that provide the ability to modify an ordered set of operations during presentation. As an example, there is a need for a technique to allow a playable media item to be inserted into consecutives slides of a slideshow such that the playable media item is presented continuously across presentation of the consecutive slides. There is also a need for a technique to allow a user to modify a pre-ordered set of operations in a slideshow during presentation. Such techniques can reduce the cognitive burden on a user who generates and presents slideshow presentations, thereby enhancing productivity. Further, such techniques can reduce processor and battery power otherwise wasted on complex editing of media items and slideshows to obtain a similar result. There is also a need for a technique to allow a user to temporarily select visually obstructed objects in a graphic editing interface. Such techniques can reduce the cognitive burden on a user who edits layered objects in a graphic editing interface, thereby enhancing productivity. Further, such techniques can reduce processor and battery power otherwise wasted on complex editing of media items to obtain a similar result.

Figure 4:
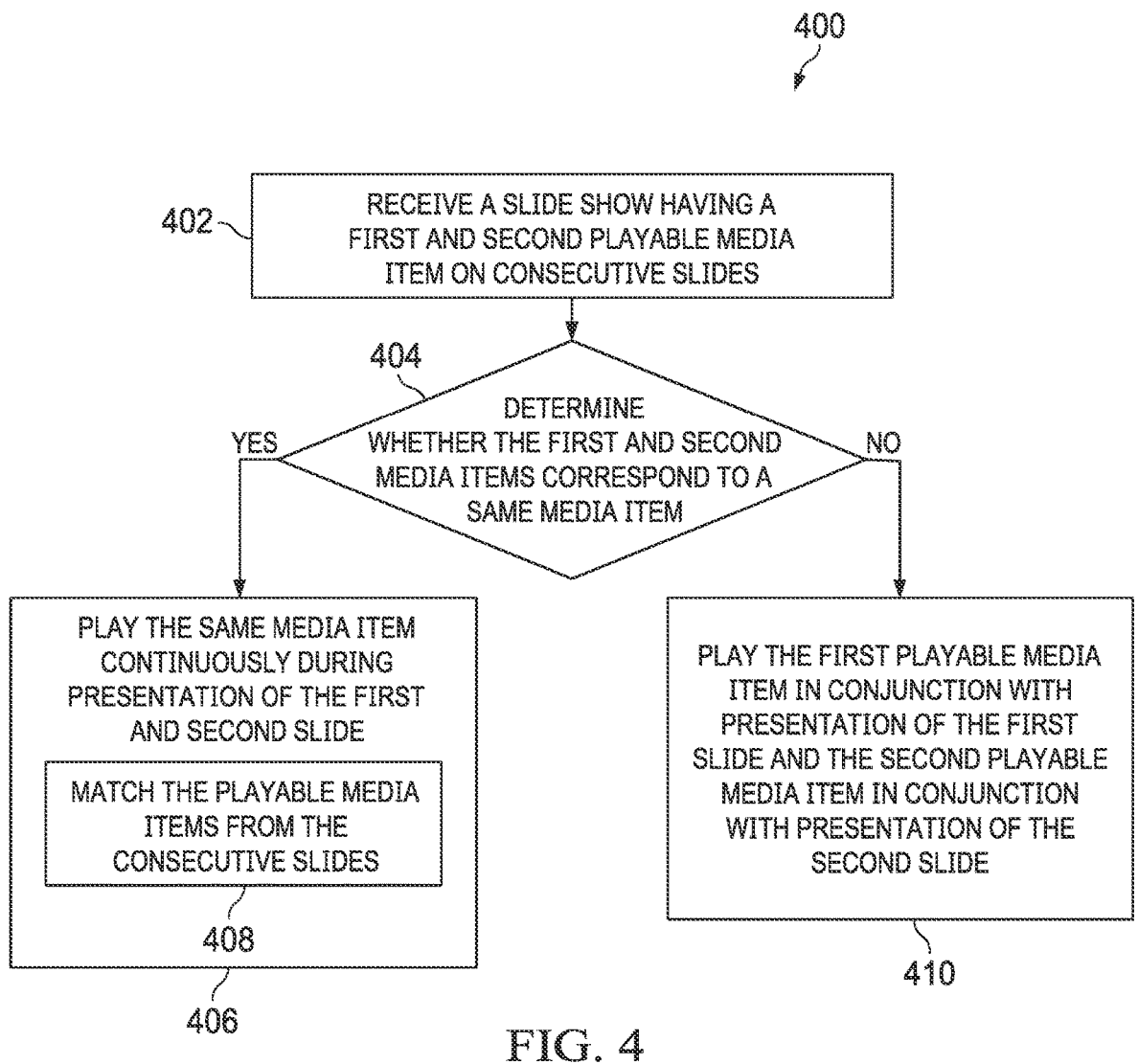
FIG. 4 illustrates a flowchart of a technique for matching playable media items across slides in accordance with some embodiments.
Figure 5:
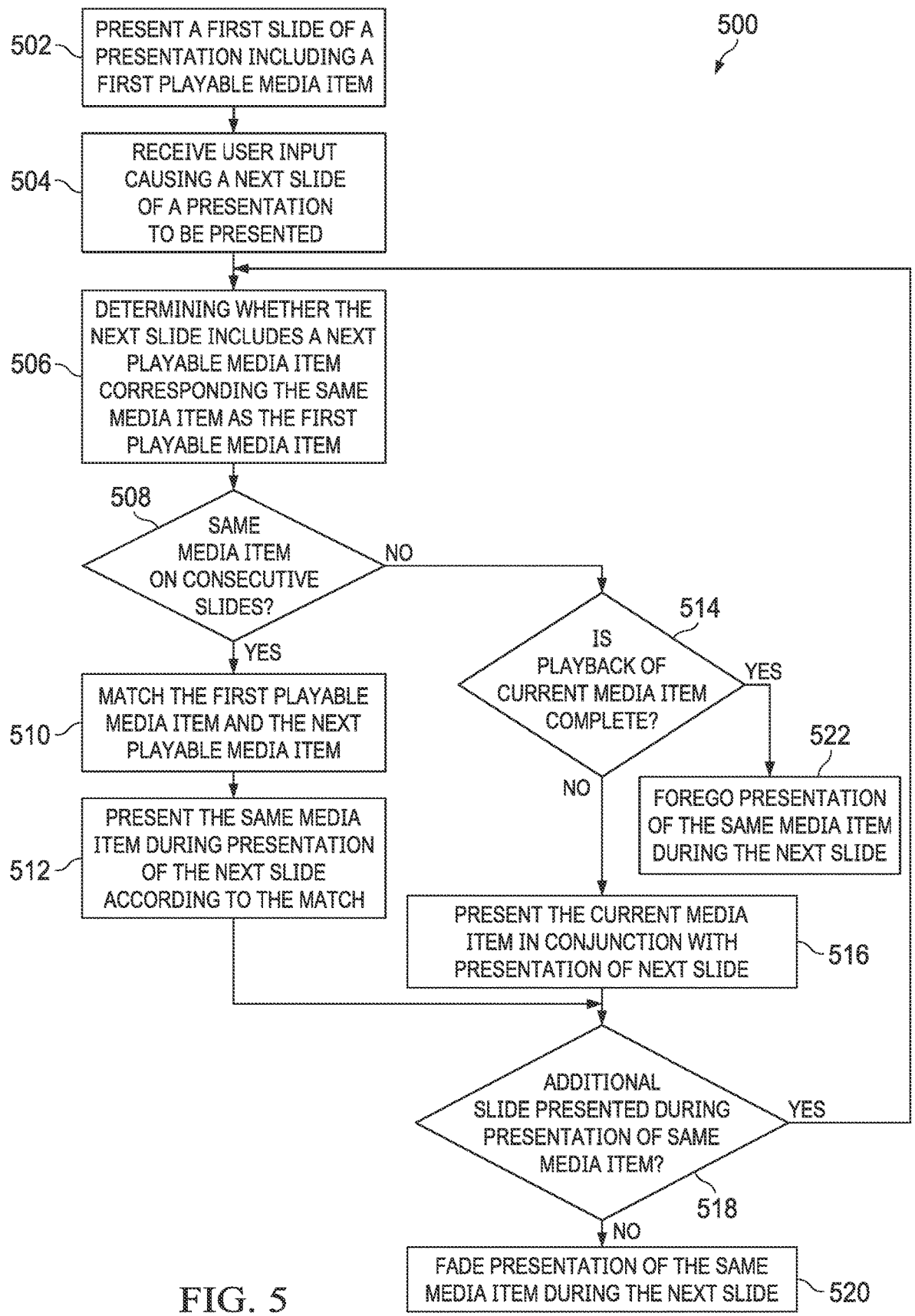
FIG. 5 illustrates a flowchart of a technique for presenting a slideshow with playable media items matched across slides in accordance with some embodiments.
Figure 6:
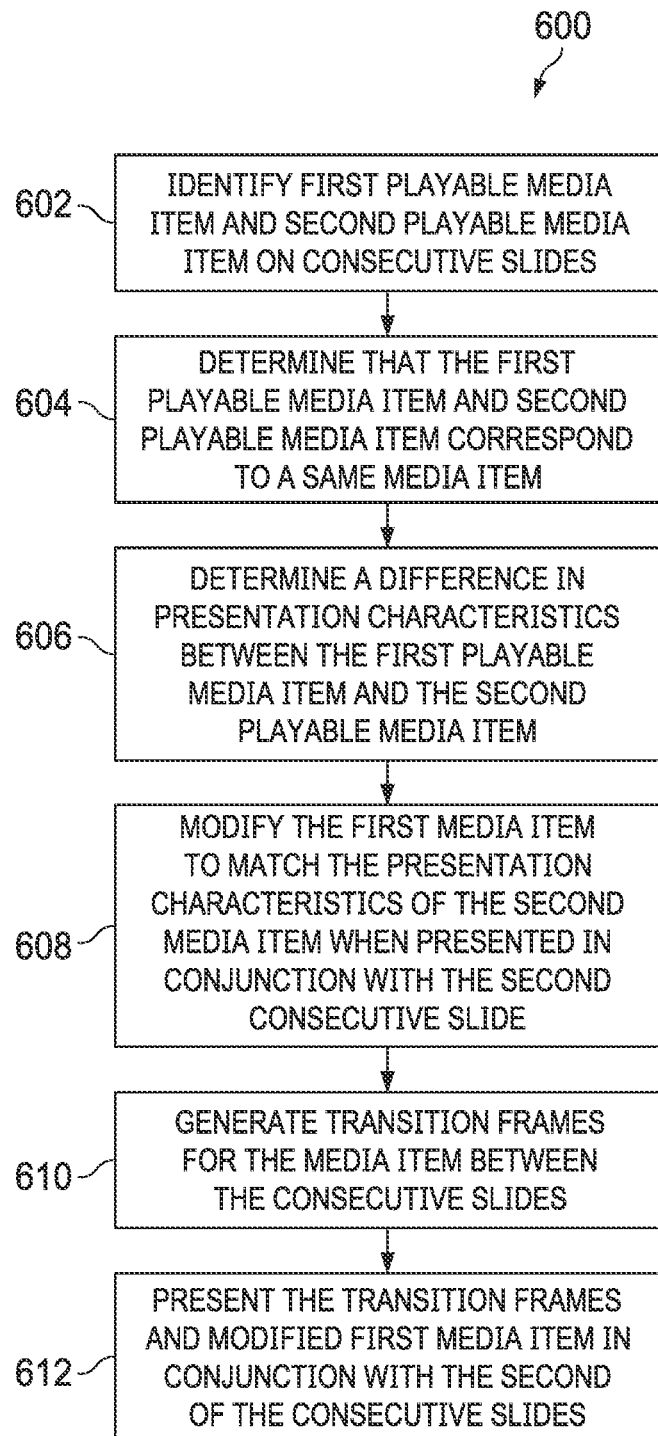
FIG. 6 illustrates a flowchart of a technique for transitioning a media item between slides in accordance with some embodiments.
Figure 7:
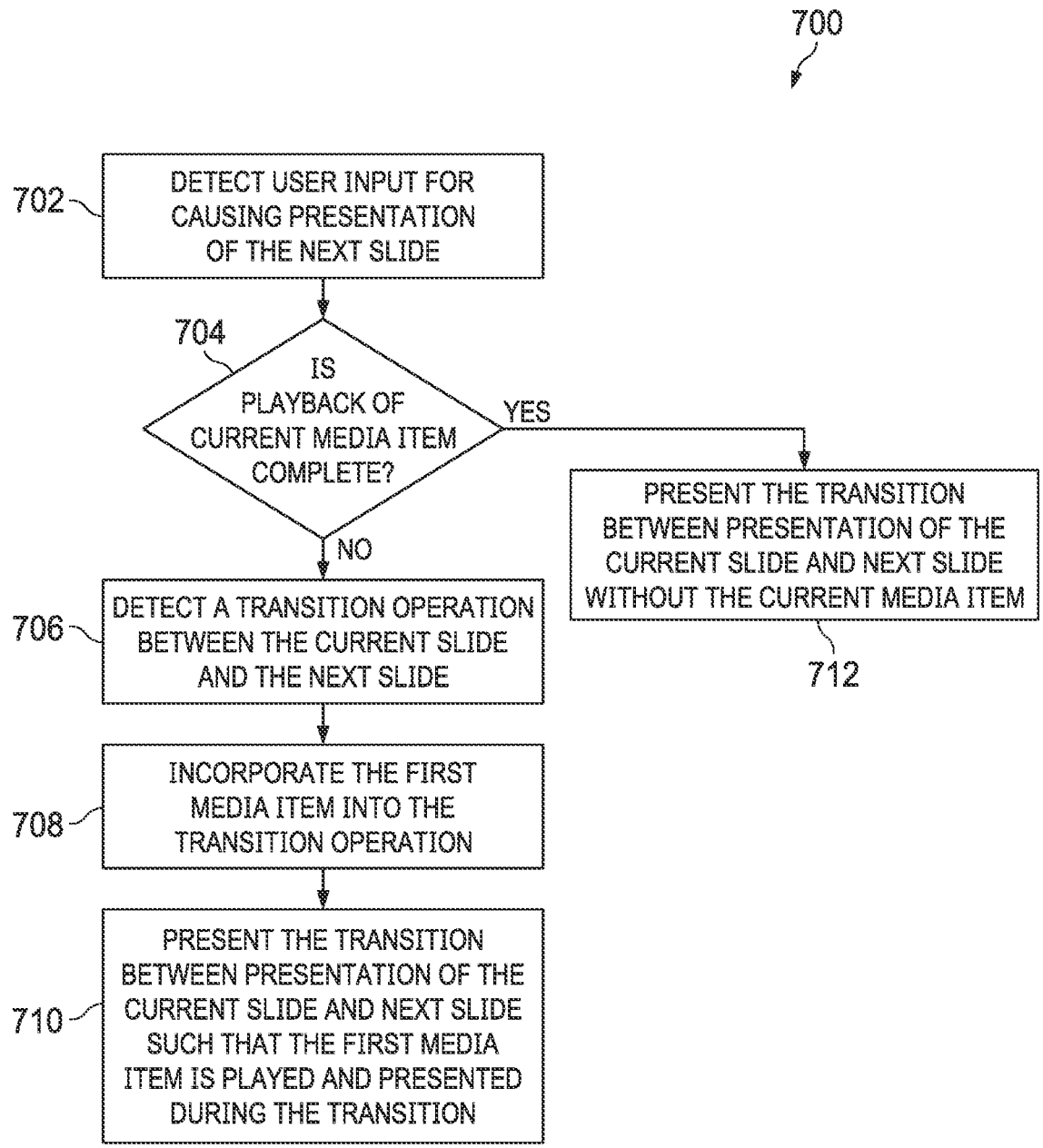
FIG. 7 illustrates a flowchart of a technique for incorporating a playable media item into a transition between two slides in accordance with some embodiments.
Figure 8A:
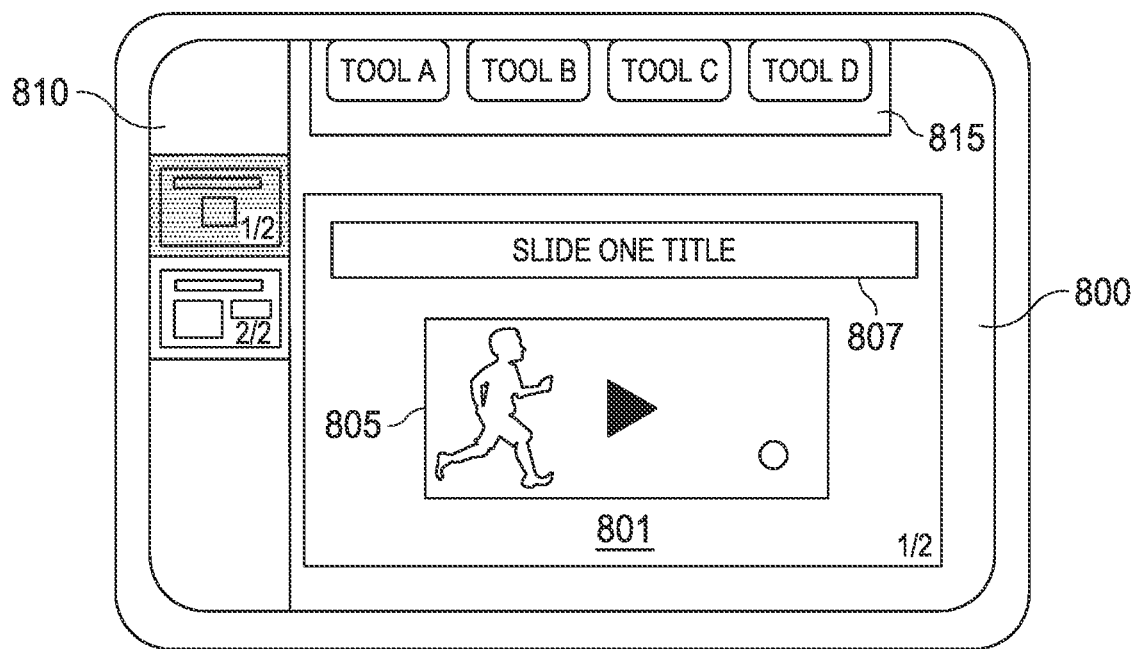
FIGS. 8A-8B illustrate example user interfaces for building a slideshow with playable media items matched across slides in accordance with some embodiments.
Figure 8B:
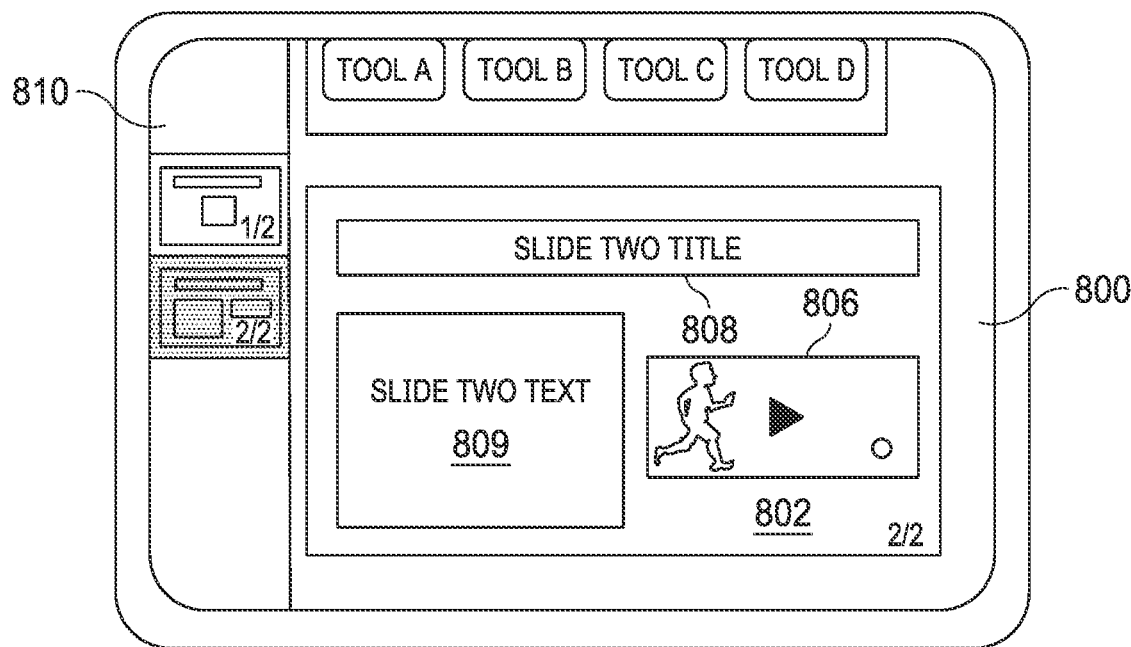
Figure 9A:
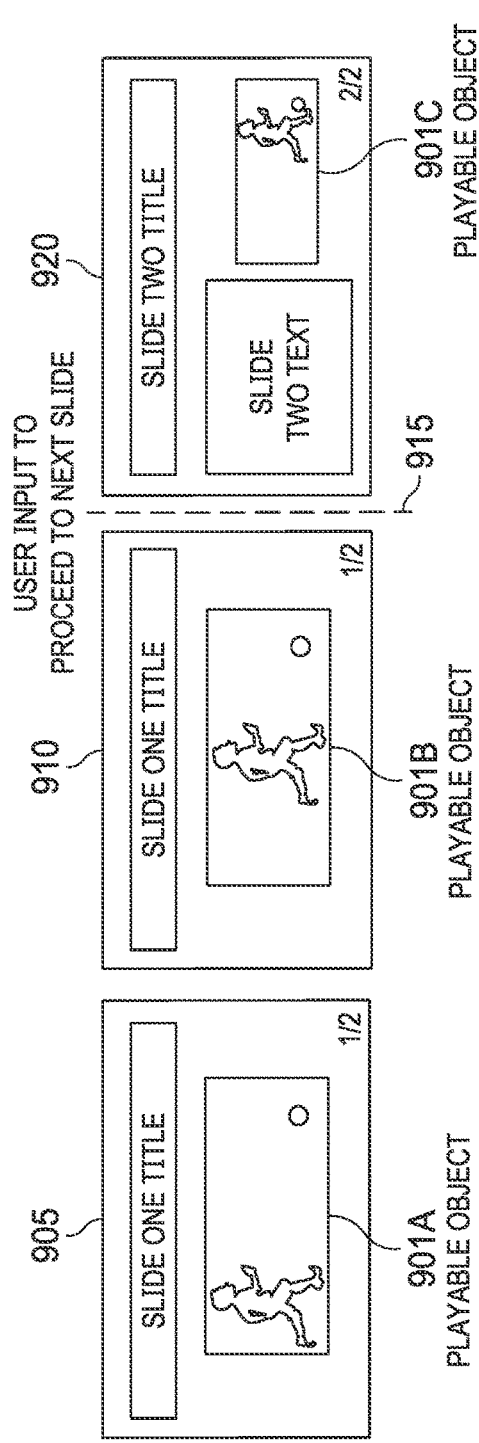
FIGS. 9A-9B illustrate frames of an example slideshow with playable media items matched across slides, in accordance with some embodiments.
Figure 9B:
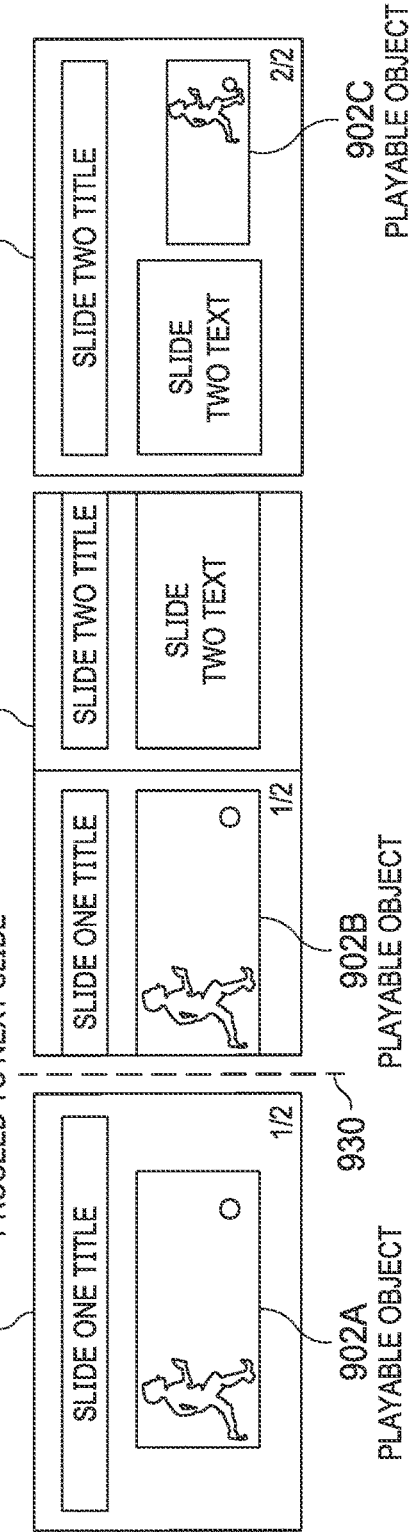
Figure 10:
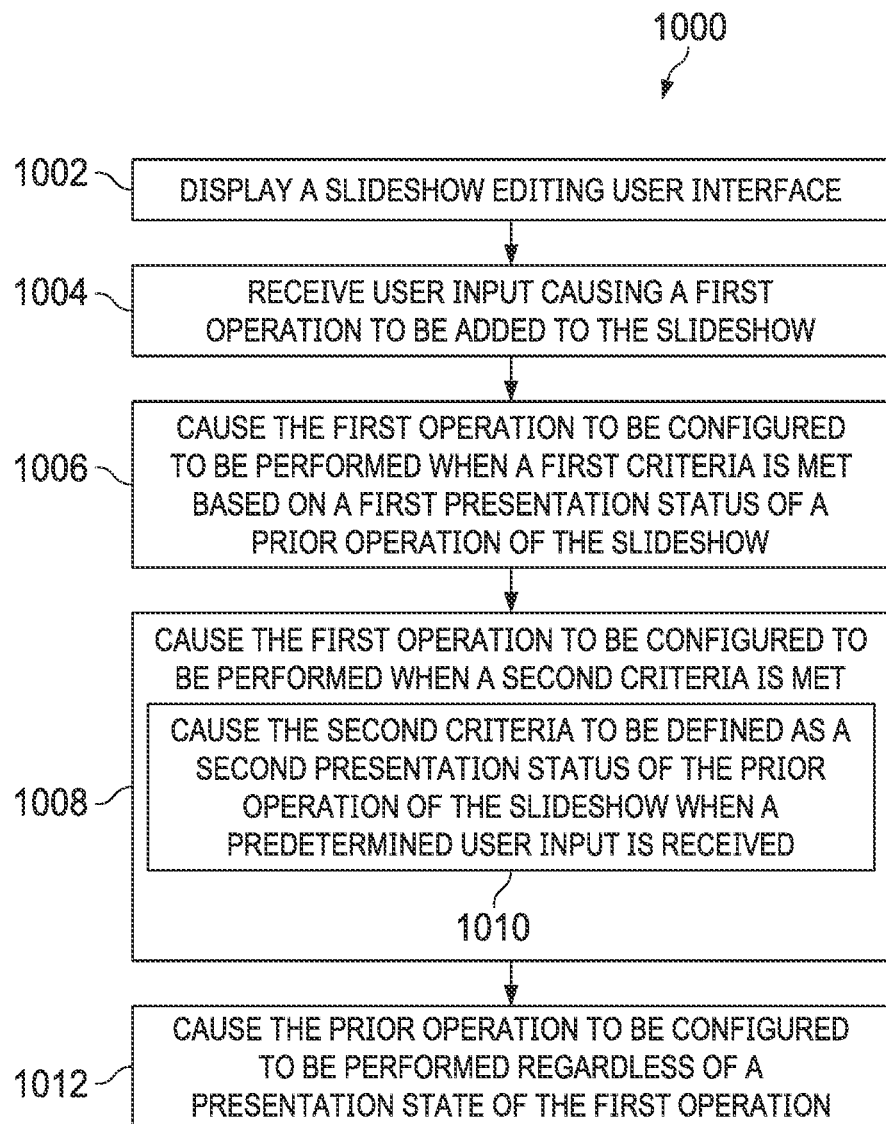
FIG. 10 illustrates a flowchart of a technique for providing an interface for editing a presentation in accordance with some embodiments.
Figure 11:
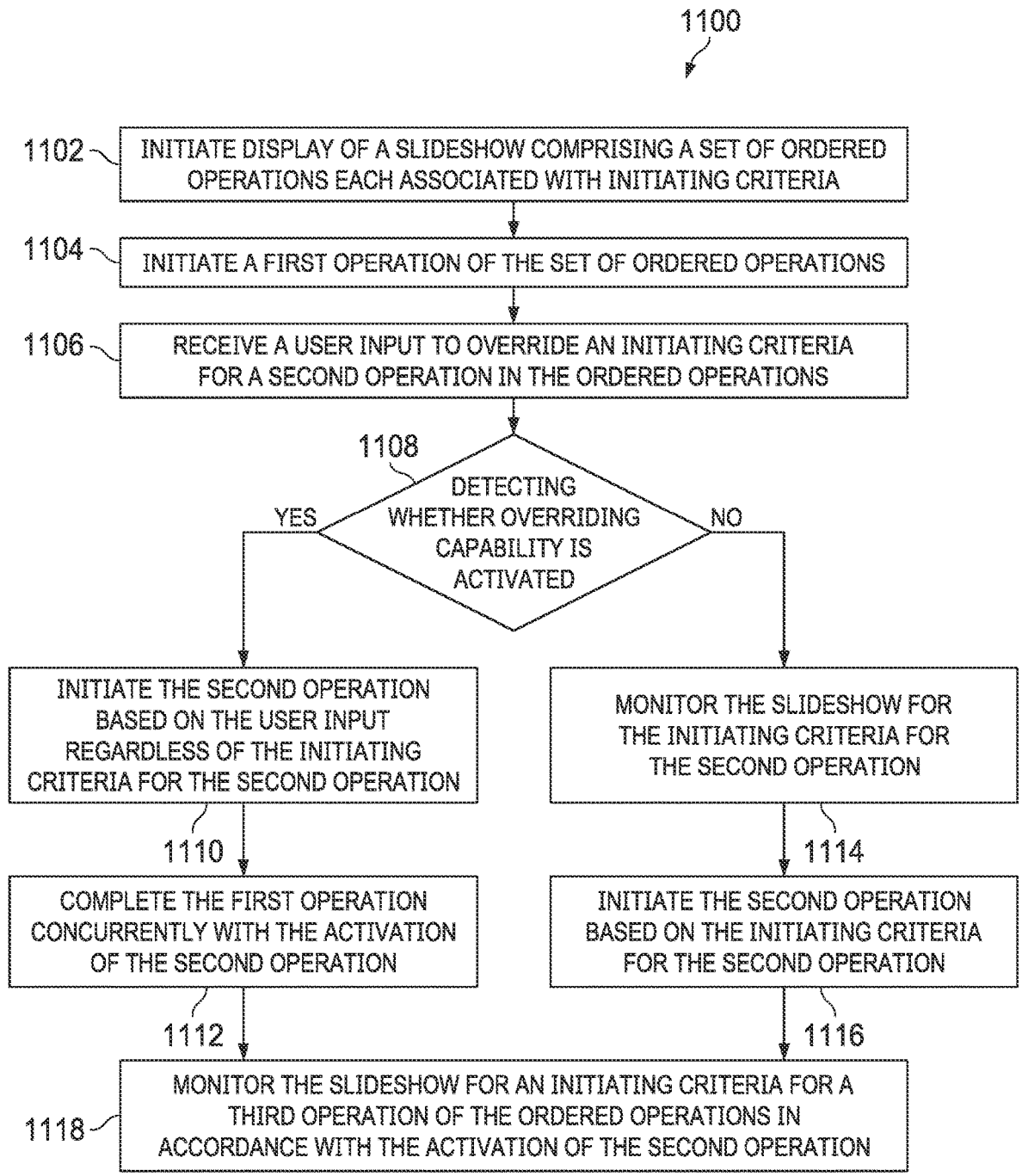
FIG. 11 illustrates a flowchart of a technique for transitioning between slides in a slideshow presentation in accordance with some embodiments.
Figure 12:
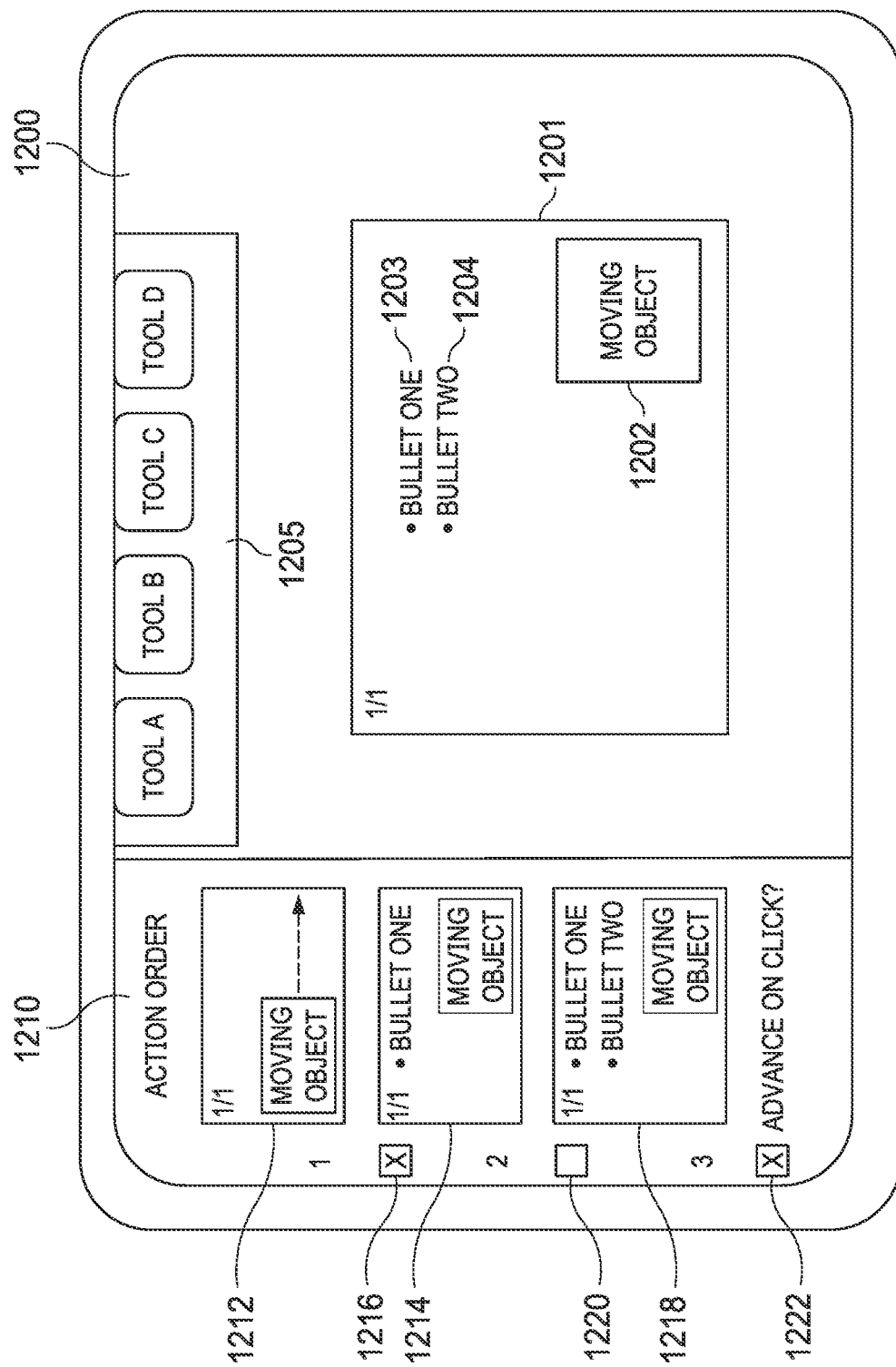
FIG. 12 illustrates an example user interface for building a slideshow having a modifiable presentation order in accordance with some embodiments.
Figure 13:
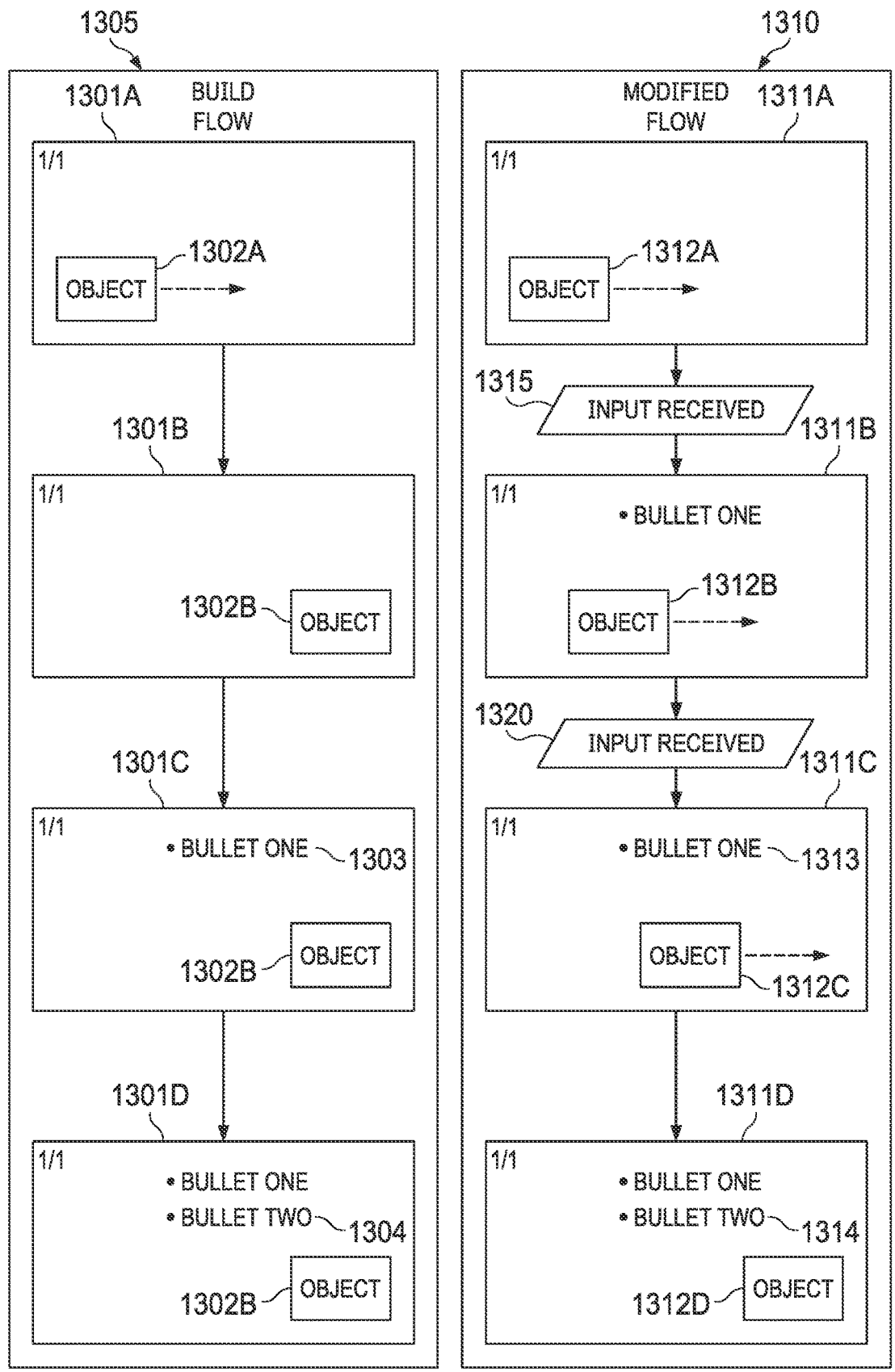
FIG. 13 illustrates a flow diagram for a slideshow having a modifiable presentation order in accordance with some embodiments.
Figure 14:
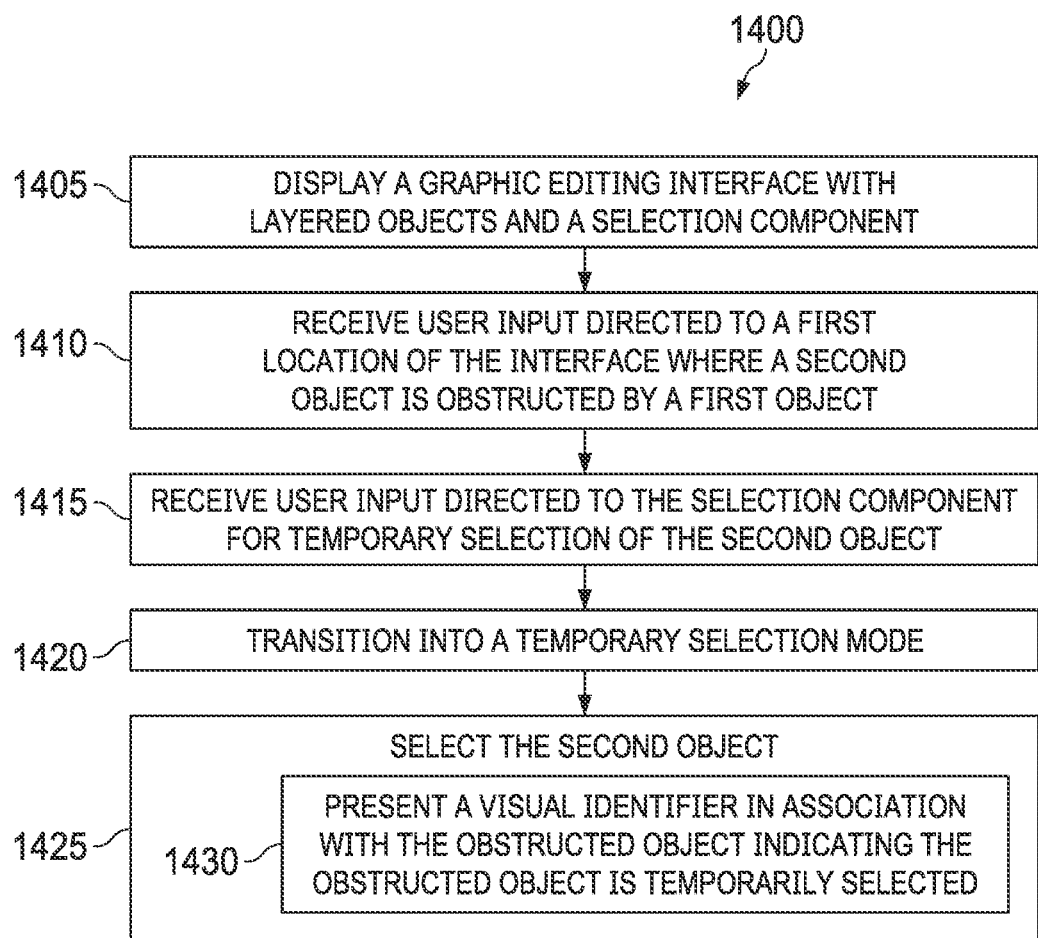
FIGS. 14-15 illustrate flowcharts of a technique for utilizing a temporary selection mode in accordance with some embodiments.
Figure 15:
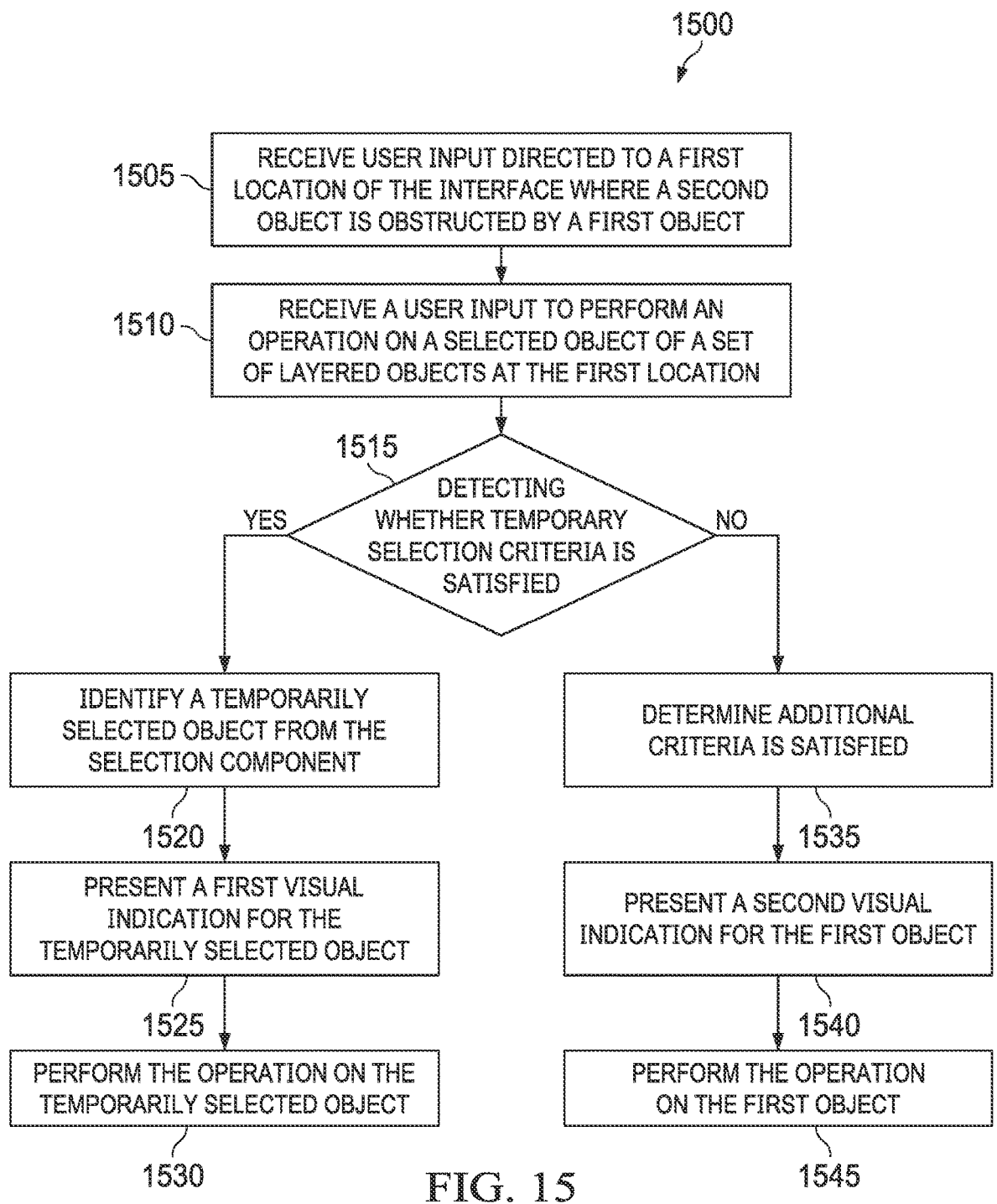

Below, FIGS. 1, 2, and 3A-3B provide a description of exemplary devices for performing the techniques for providing presentation operations. FIG. 4 illustrates a flowchart of a technique for matching playable media items across slides in accordance with some embodiments. FIG. 5 illustrates a flowchart of a technique for presenting a slideshow with playable media items matched across slides in accordance with some embodiments. FIG. 6 illustrates a flowchart of a technique for transitioning a media item between slides in accordance with some embodiments. FIG. 7 illustrates a flowchart of a technique for incorporating a playable media item into a transition between two slides in accordance with some embodiments. FIGS. 8A-8B illustrate example user interfaces for building a slideshow with playable media items matched across slides in accordance with some embodiments. FIGS. 9A-9B illustrate frames of an example slideshow with playable media items matched across slides, in accordance with some embodiments. FIG. 10 illustrates a flowchart of a technique for providing an interface for editing a presentation in accordance with some embodiments. FIG. 11 illustrates a flowchart of a technique for modifying presentation of ordered operations of a slideshow in accordance with one or more embodiments. FIG. 12 illustrates an example user interface for building a slideshow having a modifiable presentation order in accordance with some embodiments. FIG. 13 illustrates a flow diagram for a slideshow having a modifiable presentation order in accordance with some embodiments. FIGS. 14-15 illustrate a flowchart of a technique for utilizing a temporary selection mode in accordance with some embodiments. FIGS. 16A-G illustrate example user interfaces for utilizing a temporary selection mode in accordance with some embodiments.

Although the following description uses terms "first," "second," etc. to describe various elements, these elements should not be limited by the terms. These terms are only used to distinguish one element from another. For example, a first user input could be termed a second user input, and, similarly, a second user input could be termed a first user input, without departing from the scope of the various described embodiments. The first user input and the second user inputs are both user inputs, but they are not the same user input.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a user input device is described. It should be understood, however, that the electronic device optionally includes one or more physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1:
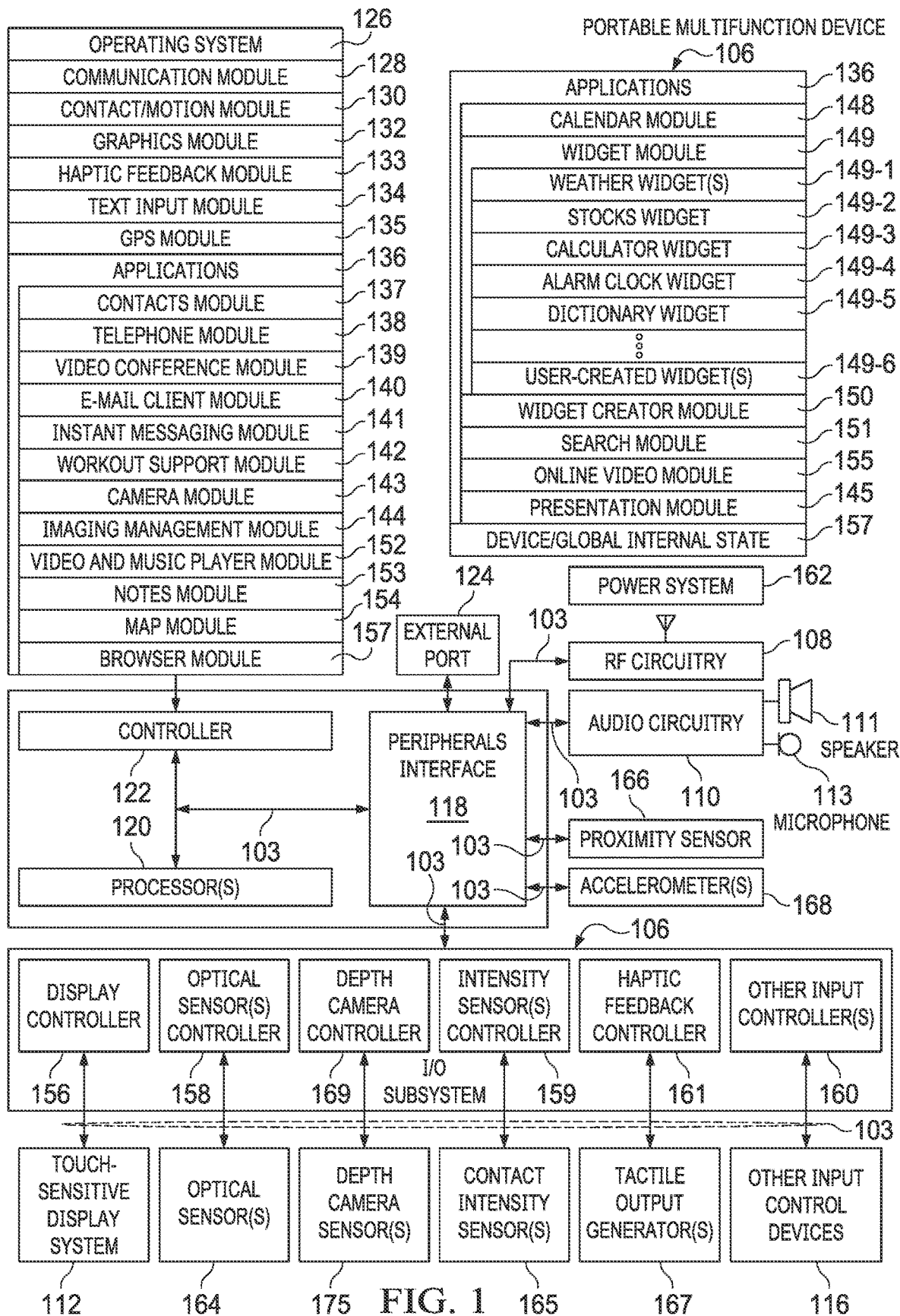
FIG. 1 is a block diagram illustrating a portable multifunction device with a touch-sensitive display in accordance with some embodiments.

Attention is now directed toward embodiments of electronic devices with displays and user input devices. FIG. 1 is a block diagram illustrating multifunction device 100 with display system 112 in accordance with some embodiments. Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

It should be appreciated that device 100 is only one example of a multifunction device, and that device 100 optionally has more or fewer components than shown, optionally combines two or more components, or optionally has a different configuration or arrangement of the components. The various components shown in FIG. 1 are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (8W), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSDPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack. The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons optionally include an up/down button for volume control of speaker 111 and/or microphone 113. The one or more buttons optionally include a push button. In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures) as input. In some embodiments, the one or more input devices are integrated with the computer system. In some embodiments, the one or more input devices are separate from the computer system.

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Display system 112 optionally has a touch-sensitive surface, sensor, or set of sensors that accepts input from the user based on haptic and/or tactile contact. Display system 112 and display controller 156 (along with any associated modules and/or sets of instructions in memory 102) detect contact (and any movement or breaking of the contact) on display system 112 and convert the detected contact into interaction with user-interface objects (e.g., one or more soft keys, icons, web pages, or images) that are displayed on display system 112. In an exemplary embodiment, a point of contact between display system 112 and the user corresponds to a finger of the user.

Display system 112 may include a touch-sensitive screen, an external display, or a built in display, and optionally uses LCD (liquid crystal display) technology, LPD (light emitting polymer display) technology, or LED (light emitting diode) technology, although other display technologies are used in other embodiments. Display system 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with display system 112. In an exemplary embodiment, projected mutual capacitance sensing technology is used, such as that found in the iPhone® and iPod Touch® from Apple Inc. of Cupertino, Calif.

A touch-sensitive display in some embodiments of display system 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Display system 112 optionally has a video resolution in excess of 100 dpi. In some embodiments, the touch screen has a video resolution of approximately 160 dpi. The user optionally makes contact with display system 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from display system 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1 shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1 shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

In some embodiments, a depth map (e.g., depth map image) contains information (e.g., values) that relates to the distance of objects in a scene from a viewpoint (e.g., a camera, an optical sensor, a depth camera sensor). In one embodiment of a depth map, each depth pixel defines the position in the viewpoint's Z-axis where its corresponding two-dimensional pixel is located. In some embodiments, a depth map is composed of pixels wherein each pixel is defined by a value (e.g., 0-255). For example, the "0" value represents pixels that are located at the most distant place in a "three dimensional" scene and the "255" value represents pixels that are located closest to a viewpoint (e.g., a camera, an optical sensor, a depth camera sensor) in the "three dimensional" scene. In other embodiments, a depth map represents the distance between an object in a scene and the plane of the viewpoint. In some embodiments, the depth map includes information about the relative depth of various features of an object of interest in view of the depth camera (e.g., the relative depth of eyes, nose, mouth, ears of a user's face). In some embodiments, the depth map includes information that enables the device to determine contours of the object of interest in a z direction.

Device 100 optionally also includes one or more contact intensity sensors 165. FIG. 1 shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1 shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1 shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1 shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 2:
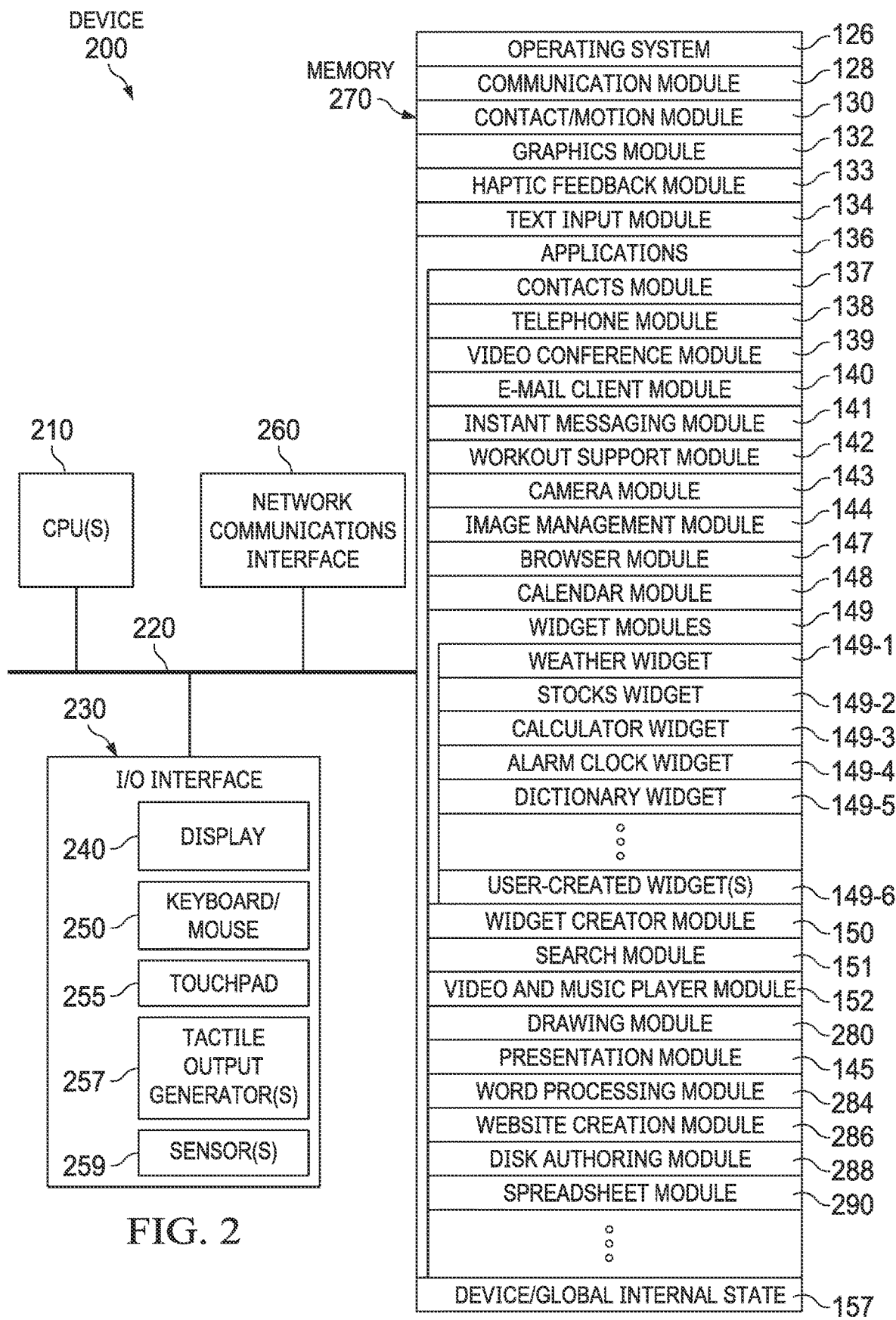
FIG. 2 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 270 (FIG. 2) stores device/global internal state 157, as shown in FIGS. 1 and 2. Device/global internal state 157 includes one or more of: active application state, indicating which applications, if any, are currently active; display state, indicating what applications, views or other information occupy various regions of display system 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with display system 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds is determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:
Contacts module 137 (sometimes called an address book or contact list);
Telephone module 138;
Video conference module 139;
E-mail client module 140;
Instant messaging (IM) module 141;
Workout support module 142;
Camera module 143 for still and/or video images;
Image management module 144;
Video player module;
Music player module;
Browser module 147;
Calendar module 148;
Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
Widget creator module 150 for making user-created widgets 149-6;
Search module 151;
Video and music player module 152, which merges video player module and music player module;
Notes module 153;
Map module 154;
Online video module 155; and/or
Presentation module 145.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, display system 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, display system 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, display system 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with display system 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with display system 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, display system 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, display system 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, display system 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, display system 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with display system 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with display system 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with display system 112, display controller 156, contact/motion module 130, graphics module 132, and text input module 134, notes module 153 includes executable instructions to create and manage notes, to-do lists, and the like in accordance with user instructions.

In conjunction with RF circuitry 108, display system 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with display system 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

In conjunction with RF circuitry 108, display system 112, display controller 156, contact/motion module 130, graphics module 132, and text input module 134, presentation module 145 is, optionally, used to generate and present slideshow presentations in accordance with user instructions. A slideshow presentation may include a set of slides on which text, media, and other content may be presented. A user may generate the slideshow using an editing mode of the presentation module 145. In a presentation mode, a user may utilize the presentation module 145 may traverse a presentation, for example, using user input.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1). In some embodiments, memory 102 optionally stores a subset of the modules and data structures identified above. Furthermore, memory 102 optionally stores additional modules and data structures not described above.

FIG. 2 is a block diagram of an exemplary multifunction device with a display and a touch-sensitive surface in accordance with some embodiments. Device 200 need not be portable. In some embodiments, device 200 is a laptop computer, a desktop computer, a tablet computer, a multimedia player device, a navigation device, an educational device (such as a child's learning toy), a gaming system, or a control device (e.g., a home or industrial controller). Device 200 typically includes one or more processing units (CPUs) 210, one or more network or other communications interfaces 260, memory 270, and one or more communication buses 220 for interconnecting these components. Communication buses 220 optionally include circuitry (sometimes called a chipset) that interconnects and controls communications between system components. Device 200 includes input/output (I/O) interface 230 comprising display 240, which is typically a touch screen display. I/O interface 230 also optionally includes a keyboard and/or mouse (or other pointing device) 250 and touchpad 255, tactile output generator 257 for generating tactile outputs on device 200 (e.g., similar to tactile output generator(s) 167 described above with reference to FIG. 1), sensors 259 (e.g., optical, acceleration, proximity, touch-sensitive, and/or contact intensity sensors similar to contact intensity sensor(s) 165 described above with reference to FIG. 1). Memory 270 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 270 optionally includes one or more storage devices remotely located from CPU(s) 210. In some embodiments, memory 270 stores programs, modules, and data structures analogous to the programs, modules, and data structures stored in memory 102 of portable multifunction device 100 (FIG. 1), or a subset thereof. Furthermore, memory 270 optionally stores additional programs, modules, and data structures not present in memory 102 of portable multifunction device 100. For example, memory 270 of device 200 optionally stores drawing module 280, presentation module 145, word processing module 284, website creation module 286, disk authoring module 288, and/or spreadsheet module 290, while memory 102 of portable multifunction device 100 (FIG. 1) optionally does not store these modules.

Each of the above-identified elements in FIG. 2 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 270 optionally stores a subset of the modules and data structures identified above. Furthermore, memory 270 optionally stores additional modules and data structures not described above.

Attention is now directed towards embodiments of user interfaces that are, optionally, implemented on, for example, portable multifunction device 100.

Figure 3A:
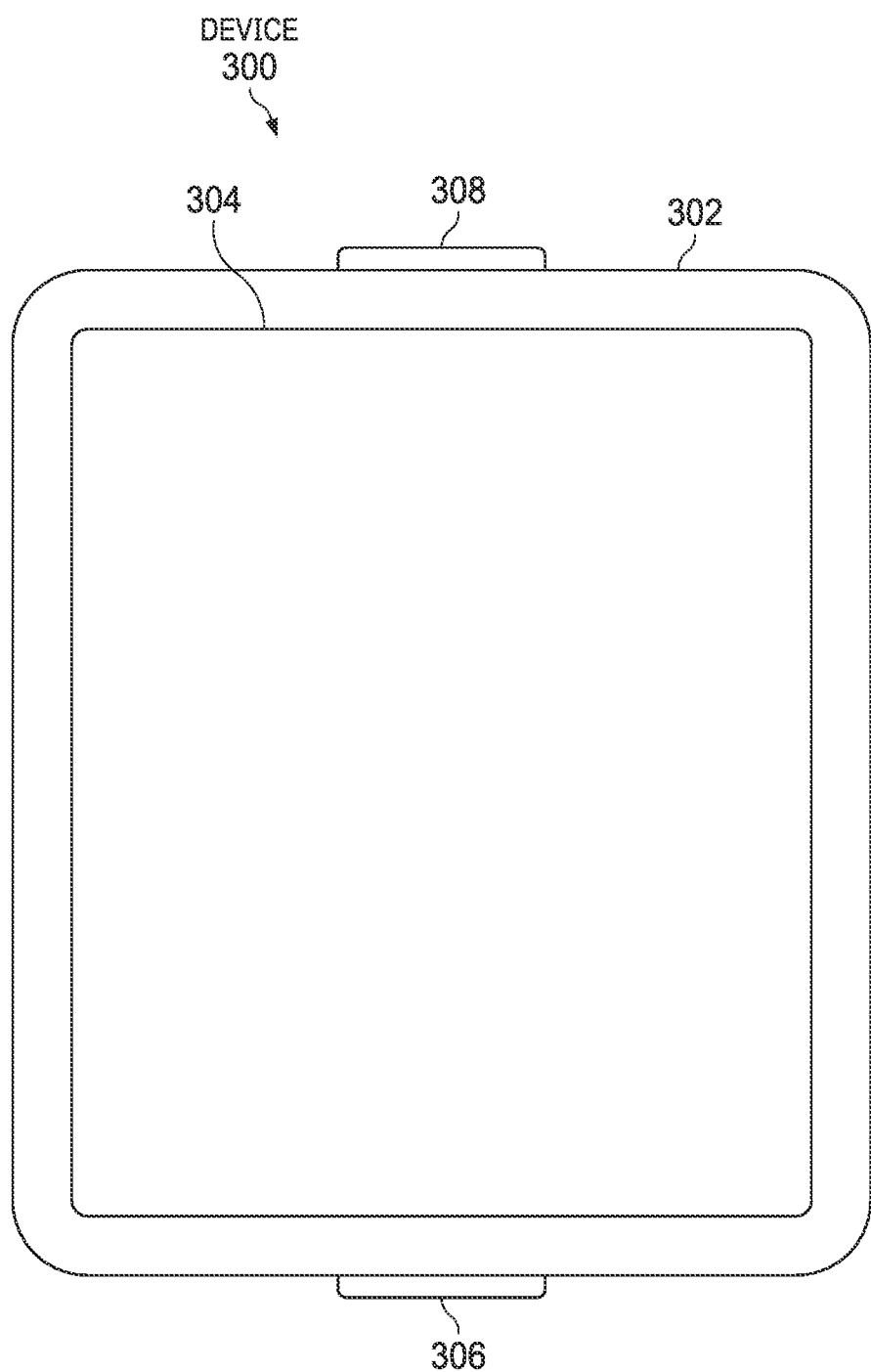
FIGS. 3A-B illustrates a personal electronic device in accordance with some embodiments.

FIG. 3A illustrates exemplary personal electronic device 300. Device 300 includes body 302. In some embodiments, device 300 can include some or all of the features described with respect to devices 100 and 200 (e.g., FIGS. 1-2).

In some embodiments, device 300 has one or more input mechanisms 306 and 308. Input mechanisms 306 and 308, if included, can be physical. Examples of physical input mechanisms include push buttons and rotatable mechanisms. In some embodiments, device 300 has one or more attachment mechanisms. Such attachment mechanisms, if included, can permit attachment of device 300 with, for example, hats, eyewear, earrings, necklaces, shirts, jackets, bracelets, watch straps, chains, trousers, belts, shoes, purses, backpacks, and so forth. These attachment mechanisms permit device 300 to be worn by a user.

Figure 3B:
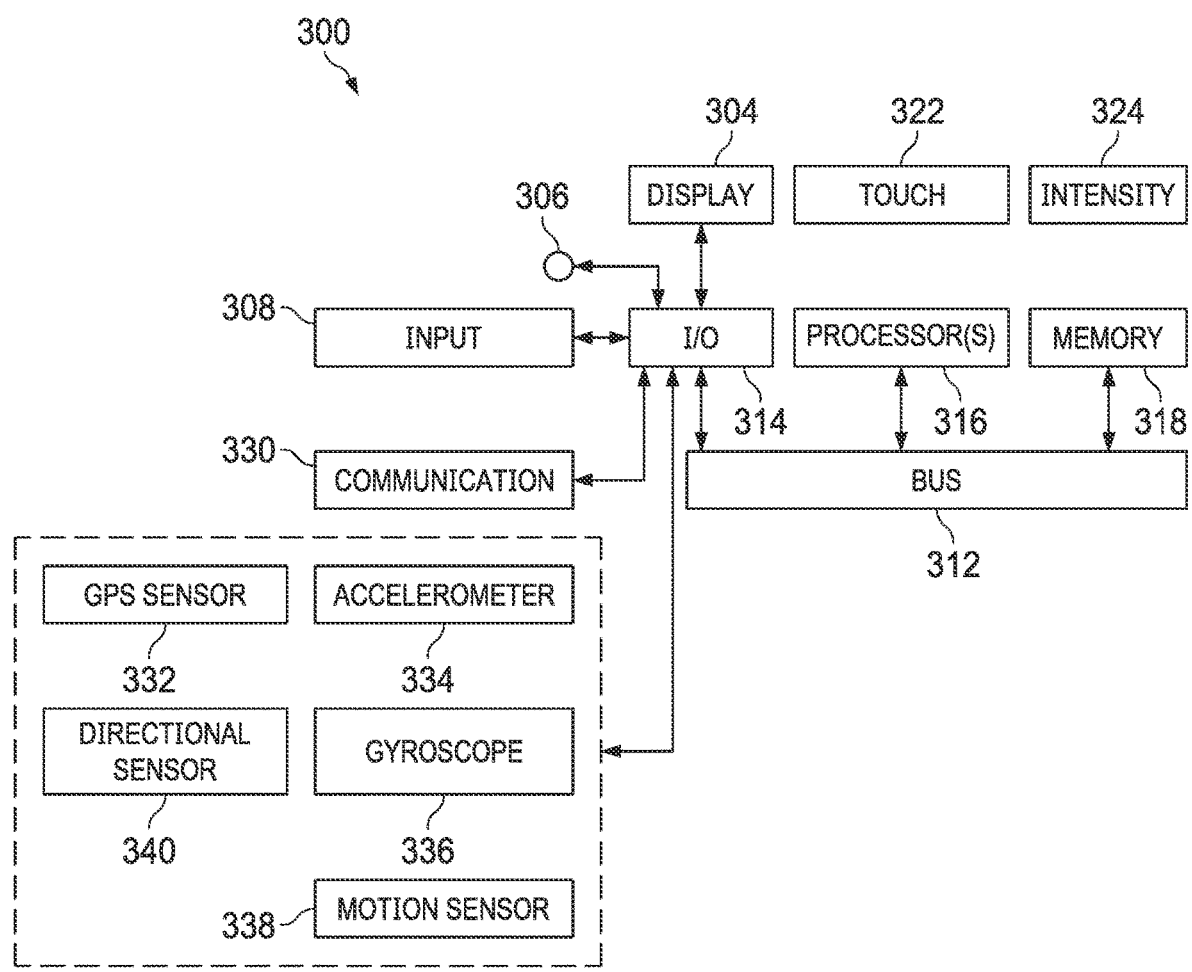

FIG. 3B depicts exemplary personal electronic device 300. In some embodiments, device 300 can include some or all of the components described with respect to FIGS. 1 and 2. Device 300 has bus 312 that operatively couples I/O section 314 with one or more computer processors 316 and memory 318. I/O section 314 can be connected to display 304, which can have touch-sensitive component 322 and, optionally, intensity sensor 324 (e.g., contact intensity sensor). In addition, I/O section 314 can be connected with communication unit 330 for receiving application and operating system data, using Wi-Fi, Bluetooth, near field communication (NFC), cellular, and/or other wireless communication techniques. Device 300 can include input mechanisms 306 and/or 308. Input mechanism 306 is, optionally, a rotatable input device or a depressible and rotatable input device, for example. Input mechanism 308 is, optionally, a button, in some examples.

Input mechanism 308 is, optionally, a microphone, in some examples. Personal electronic device 300 optionally includes various sensors, such as GPS sensor 332, accelerometer 334, directional sensor 340 (e.g., compass), gyroscope 336, motion sensor 338, and/or a combination thereof, all of which can be operatively connected to I/O section 314.

Memory 318 of personal electronic device 300 can include one or more non-transitory computer-readable storage mediums, for storing computer-executable instructions, which, when executed by one or more computer processors 316, for example, can cause the computer processors to perform the techniques described below, including processes 602-1118 (FIGS. 6-11). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 300 is not limited to the components and configuration of FIG. 3B, but can include other or additional components in multiple configurations.

As used here, the term "affordance" refers to a user-interactive graphical user interface object that is, optionally, displayed on the display screen of devices 100, 300, and/or 300 (FIGS. 1, 2, and 3A-3B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 255 in FIG. 2) while the cursor is over a particular user interface element (e.g., a button, window, slider, or other user interface element), the particular user interface element is adjusted in accordance with the detected input.

Attention is now directed towards embodiments of user interfaces ("UI") and associated processes that are implemented on an electronic device, such as portable multifunction device 100, device 200, or device 300.

FIG. 4 is a flow diagram illustrating a method for presenting a playable media item continuously across multiple slides using an electronic device in accordance with some embodiments. Method 400 is performed at a device (e.g., 100, 200, 300) with a display. Some operations in method 400 are, optionally, combined, the orders of some operations are, optionally, changed, and some operations are, optionally, omitted.

As described below, method 400 provides an intuitive way for presenting a playable media item continuously across multiple slides. The method reduces the cognitive burden on a user for presenting a playable media item continuously across multiple slides, thereby creating a more efficient human-machine interface. For battery-operated computing devices, enabling a user to present a playable media item continuously across multiple slides is faster, more efficiently conserves power, and increases the time between battery charges. Additionally, the method provides an enhanced technique for presenting the playable media item by reducing the amount of manipulation that a user must perform on the media item for a presentation.

Flowchart 400 begins at block 402, where presentation module 145 receives a slideshow having a first and second playable media items on consecutive slides (e.g., there are no other slides between a first slide and a second slide). As an example, a user may edit, during an editing mode of the presentation module 145, the first slide to include the first media item and the second slide to have the second media item. Examples of the playable media items include, but are not limited to, an audio media item (e.g., a song, an audio recording, an audio clip, etc.), a video media item (e.g., a movie, a visual recording, a video clip, etc. captured by a recording device), an animation (e.g., graphical elements displayed one after another in a sequence), an enhanced image file (e.g., a series of still photos captured in sequence with or without corresponding audio data captured by a camera), and the like.

The flowchart continues at block 404, where a determination is made regarding whether the first and second playable media items correspond to a same media item. For example, the first playable media item and the second playable media items may be identical playable media items and, as such, correspond to a same media item. As another example, the first playable media item and the second playable media items may not be identical, but may be instances of the same media item. This may occur, for example, if the first playable media item and the second playable media item are associated with different file names, come from different sources, are encoded such that the files are not identical, and the like. As such, the first playable media item and the second playable media item may be instances of the same media item. An example technique for determining whether the playable media items correspond to a same media item will be described in greater detail below with respect to FIG. 5.

If a determination is made at 404 that the first playable media item and the second playable media item both correspond to a same media item, then the flowchart continues at block 406. At block 406, the presentation module 145 plays the same media item continuously during presentation of the first and second slide. Said another way, during a presentation mode, if the first media item has not concluded by the time the second of the consecutive slides is presented, then the same media item is presented across the consecutive media slides to appear continuously regardless of when a user presents the second of the consecutive slides.

According to one or more embodiments, the same media item is played continuously by matching the playable media items from the consecutive slides as in block 408. For example, the first playable media item and the second playable media item may be matched such that when the second of the consecutive slides is presented, the second playable media item begins from a timestamp at which the first playable media item left off. According to some embodiments, the second playable media item may simply be replaced by the first playable media item such that the first playable media item plays continuously across the consecutive slides. As another example, presentation characteristics of the first playable media item and the second playable media item may differ across the first and second slides of the consecutive slides. As such, the first playable media item may be modified in order to present a continuous playable media item during presentation of the slideshow such that the playable media item transitions from one presentation style to another.

Returning to 404, if a determination is made that the first playable media item and the second playable media item correspond to different media items, then the flowchart continues to block 410, and the presentation module 145 plays the first playable media item in conjunction with presentation of the first slide in accordance with predetermined presentation characteristics of the first media item, and the second playable media item in conjunction with presentation of the second slide in accordance with presentation characteristics of the second playable media item. In one or more embodiments, the corresponding media items may be played in accordance with initiation of the presentation of the slide, or, in some examples, presented in accordance with other criteria as the corresponding slide is presented.

FIG. 5 is a flow diagram illustrating a method for modifying presentation of playable media items on consecutive slides according to a match using an electronic device in accordance with some embodiments. Method 500 is performed at a device (e.g., 100, 200, 300) with a display. Some operations in method 500 are, optionally, combined, the orders of some operations are, optionally, changed, and some operations are, optionally, omitted.

As described below, method 500 provides an intuitive way for modifying presentation of playable media items on consecutive slides according to a match. The method reduces the cognitive burden on a user for modifying presentation of playable media items on consecutive slides according to a match, thereby creating a more efficient human-machine interface. For battery-operated computing devices, enabling a user to modifying presentation of playable media items on consecutive slides according to a match faster and more efficiently conserves power and increases the time between battery charges. Additionally, the method provides an enhanced technique for presenting the playable media item by reducing the amount of manipulation that a user must perform on the media item for a presentation.

The flowchart begins at 502, where the presentation module 145 presents, on the display, the first slide of the presentation including a first playable media item according to one embodiment, the first playable media item may include, for example, an audio file, video file, and animation, and enhanced image file, and the like.

The flowchart continues at block 504, where the presentation module 145 receives user input causing the presentation to be presented. As an example, a user may click a button, provide a gesture, present a cue, or the like, to transition a presentation of the slideshow from the first slide to the second slide.

At block 506, the presentation module 145 determines whether the next slide includes a next playable media item corresponding to the same media item as the first playable media item. According to our embodiments, the determination as to whether the first media item and the next media item correspond to the same media item may be performed in a number of ways. For example, the presentation module 145 may compare heuristics of the first playable media item and the second playable media item. Those heuristics may include, for example, filenames, video or audio links, file hashes, and the like. In one or more embodiments, one or more heuristics may be compared to determine a confidence value corresponding to a likelihood that the first playable media item and the second playable media item correspond to the same media item. In one or more embodiments, if the confidence value satisfies a predetermined threshold, then the presentation module 145 determines the first playable media item and the second playable media item to correspond to the same media item.

At 508, the presentation module 145 determines whether the same media item is included on the consecutive slides. The determination may be made at various times in the presentation process, such as before presenting, in response to receiving a request to present a slideshow, in response to receiving a request to progress to a next slide while a media item is active, and the like. If a determination is made that the same media item is included on the consecutive slides, then the flowchart continues to 510, and the presentation module 145 matches the first playable media item with the next playable media item. The first playable media item and the next playable media item may be matched in a number of ways to provide continuous playback of the same media item across consecutive slides. As an example, the first media item of the first slide may be modified to match the presentation style of the next media item on the next slide while still playing such that playback of the media item appears continuous and transitions between the corresponding presentation characteristics of a currently presented slide and the next slide. Said another way, in some embodiments, the first media item from the first slide may replace the next media item in the next slide if it is determined that the first playable media item and the next playable media item corresponds to a same media item. Alternatively, in other embodiments, the first media item may be modified to transition into presentation characteristics of the second media item such that the transition between the first playable media item and the second playable media item appears continuous.

The flowchart continues at 512, where the presentation module 145 presents the same media item during presentation of the next slide according to the match. As described above, presenting the same media item during presentation of the next slide may include replacing the second playable media item with the first playable media item, modifying the playback of the second playable media item to begin at a time stamp associate with the termination of the first playable media item, or the like.

At 518, a determination is made regarding whether additional slides are presented during the presentation of the same media item. As an example, if the same media item has not completed and the presentation module 145 receives user input to present a third slide, then the flowchart returns to block 506, and the presentation module 145 determines whether the next slide (e.g., the third slide) includes a next playable media item (e.g., a third playable media item) corresponding to the same media item as the first playable me item. At block 508, if it is determined that the same media item is also presented on the third slide, then the flowchart continues to block 510 such that the first playable media item and the third playable media item are matched, and then at block 512 the same media item is presented in accordance with the match.

If a determination is made at block 518 that an additional slide is not presented during presentation of the same media item, then the flowchart continues to block 520, and the presentation module 145 foregoes presentation of the same media item during the next slide. Said another way, if the same media item is presented across the first and second slide, and the third consecutive slide does not include an instance of the same media item, the same media item will continue to play and, optionally, will fade out in the third slide until it is no longer presented. As an example, and opacity of an image or video file may be reduced, and/or a volume of an audio file may be reduced.

Returning to block 508, in some embodiments, if it is determined that the same media item is not on consecutive slides then the flowchart continues to block 514, and a determination is made as to whether playback of the current media item is complete. For example, in the first iteration, whether the first playable media item is complete when the second slide is presented. Optionally, if a determination is made at 514 that the playback of the current media item is complete, and the flowchart continues to block 522, and the presentation module 145 foregoes presentation of the same media item during the next slide. Said another way, if two consecutive slides contain instances of the same media item, and the media item completes during the first presentation of the first slide, then in some embodiments, the media item will be omitted in the second of the consecutive slides. In other embodiments, the media item will restart from the beginning of the media item in the second of the consecutive slides when the media item completes during the first presentation of the first slide and the second slide contains an instance of the same media item.

If at block 514, it is determined that playback of the current media item is not complete, then the flow chart continues to block 516, where the presentation module 145 presents the current playable media item in conjunction with presentation of the next slide. Said another way, rather than simply ending the playable media item when the slide moves on, if some embodiments the changing of the slide does not end the presentation of the playable media item. As such, the playable media item may continue to play in conjunction presentation of the next slide.

FIG. 6 is a flow diagram illustrating a method for incorporating a transition into a media item for presentation between consecutive slides using an electronic device in accordance with some embodiments. Method 600 is performed at a device (e.g., 100, 200, 300) with a display. Some operations in method 600 are, optionally, combined, the orders of some operations are, optionally, changed, and some operations are, optionally, omitted.

As described below, method 600 provides an intuitive way for incorporating a transition into a media item for presentation between consecutive slides. The method reduces the cognitive burden on a user for modifying presentation of playable media items on consecutive slides according to a match, thereby creating a more efficient human-machine interface. For battery-operated computing devices, enabling a user to modifying presentation of playable media items on consecutive slides according to a match faster and more efficiently conserves power and increases the time between battery charges. Additionally, the method provides an enhanced technique for presenting the playable media item by allowing a user to configure a slideshow such that the presentation of the slideshow is modifiable during a playback mode.

The flowchart of the 600 begins at 602 where the presentation module 145 identifies a first playable media item and a second playable media item on consecutive slides (e.g., a first slide directly followed by a second slide in a slideshow). According to some embodiments, the presentation module 145 may identify the first and second playable media items prior to the display of the presentation, when a presentation is initiated, during the presentation, in response to a request to progress to a next slide while a media item is active, and the like. Optionally, the presentation module may identify the first playable media item in the second playable media item during the presentation of the consecutive slides in presentation mode.

The flowchart 600 continues to block 604, where the presentation module 145 determines that the first playable media item and the second playable media item correspond to a same media item. As described above, in some embodiments, the first playable media item and second playable media item may not be identical and yet may correspond to a same media item. As an example, the two files may be compared for file name, size, duration, or other properties. The determination that the first and second label media items correspond to a same media item may include comparing characteristics of the first and second playable media items. Optionally, a confidence value may be determined based on the characteristics of the first and second label media items.

Further, in some embodiments, the confidence value may be compared against a predetermined threshold to determine whether or not the first playable media item and the second playable media item correspond to a same media item. The determination may be made at various times during the presentation process, such as prior to the display of the presentation, when a presentation is initiated, during the presentation, in response to a request to progress to a next slide while a media item is active, and the like.

The flowchart continues to 606, where the presentation module 145 determines the difference in presentation characteristics between the first playable media item and the second playable media item. As an example, a user may insert the first playable media item in the first slide with a first set of presentation characteristics and the second playable media item in the second slide with second presentation characteristics. Examples of presentation characteristics that may differ between first and second playable media items include, but are not limited to limited to, volume, opacity, playback speed, size or rotation, color profiles, audio effects, and/or graphical effects such as shadows, borders, or color filters.

The flowchart 600 continues to block 608, where the presentation module 145 modifies the first playable media item to match presentation characteristics of the second playable media item when presented in conjunction with the second consecutive slide. According to some embodiments, the first media item may be modified to match the second playable media item, such that the first playable media item can replace the second playable media item in the second of the consecutive slides. In some embodiments, the first playable media item is modified to match the presentation characteristics of the second playable media item when the slide in which the second media item is found is presented such that the modified first playable media item provides an endpoint for the first playable media item on the first slide.

The flowchart continues at block 610, where the presentation module 145 generates transition frames for the media item between the consecutive slides. In some embodiments, the first playable media item is utilized to generate transition frames (e.g., interpolated frames) between the presentation characteristics of the first media item and the matched presentation characteristics of the second media item from block 608 such that the media item appears to smoothly transition from one set of presentation characteristics to another when the slides are transitions. In some embodiments, an interpolation may include modifying a series of frames of the playable media item to be presented during a transition based on an interpolation of the presentation characteristics.

The flowchart concludes at the 612, where the presentation module 145 presents the transition frames and modified first media item in conjunction with the second of the consecutive slides. In accordance with our embodiments, the transition frames and the modified first media item may present the final media item frames that are presented as part of the transition between the first and second slide prior to the second playable media item being presented in association with the second of the consecutive slides. In some embodiments, the second playable media item on the second slide is replaced by the modified first playable media item as it was modified at block 608.

FIG. 7 is a flow diagram illustrating a method for incorporating an active playable media item in a transition between two consecutive slides using an electronic device in accordance with some embodiments. Method 700 is performed at a device (e.g., 100, 200, 300) with a display. Some operations in method 700 are, optionally, combined, the orders of some operations are, optionally, changed, and some operations are, optionally, omitted.

As described below, method 700 provides an intuitive way for incorporating an active playable media item in a transition between two consecutive slides. The method reduces the cognitive burden on a user for modifying presentation of playable media items on consecutive slides according to a match, thereby creating a more efficient human-machine interface. For battery-operated computing devices, enabling a user to modifying presentation of playable media items on consecutive slides according to a match faster and more efficiently conserves power and increases the time between battery charges. Additionally, the method provides an enhanced technique for incorporating a playable media item during a transition between consecutive slides.

The flowchart begins at block 702, where the presentation module 145 detects user input for causing presentation of the next slide. As an example, a user may be presenting a slideshow while on the first slide, and click a button or otherwise provide user cause a slideshow presentation to advance to a next slide, such as the second slide. In some embodiments, the currently presented slide may include a current media item.

At block 704, a determination is made as to whether playback of the current media item is complete. For example, the current media item may have a short duration and, thus, reached its conclusion prior to the user causing next slide to be presented. If at block 704 a determination is made that playback of the current media item is complete, then the flowchart continues to block 712, where the presentation module 145 present the transition between presentation of the current slide and the next slide without the current media item. That is, if the current media item has already reached its conclusion, there is no need for the media item to be played during the transition according to some embodiments.

Returning to block 704, if a determination is made that playback of the current media item is not complete upon detection of user input for causing presentation of the next slide, then the flowchart continues to block 706. At block at 706, the presentation module 145 detects a transition operation between the current slide and the next slide. The transition operation may include, for example, an animation between the first slide and the second slide.

At block at 708, the media item is incorporated into the transition operation. For example, if the first slide fades into the second slide, the first media item may continue playing, but will fade into presentation characteristics of the media item on the second slide. As another example, if the transition operation indicates that the first slide is swept across the screen to reveal the second slide, then the media item may continue to play as it is swept across the screen, and continue to play in a determined location in the second slide. The media item may be incorporated by applying a warping function to at least a portion of the media item to match a transition operation between slides in some embodiments.

The flowchart concludes at block 710, where the presentation module 145 presents a transition between presentation of the current slide in the next slide such that the media item is integrated into the transition. As an example, if the transition includes an animation, the same media item will be integrated into the animation and played during the animation.

FIGS. 8A-8B illustrate exemplary user interfaces for modifying presentation of playable media items on consecutive slides according to a match using an electronic device in accordance with some embodiments. The user interfaces in these figures are used to illustrate the processes described above, for example the processes in FIGS. 4-7.

FIG. 8A depicts a graphics editing interface 800 by which a slideshow may be generated. The graphics editing interface may be an editing module for a presentation module 145, according to some embodiments. The graphic editing interface 800 may be presented on a display of a device, such as display 304 of personal electronic device 300 of FIG. 3, according to some embodiments.

For purposes of the example presented in FIG. 8A, the graphic editing interface 800, includes an editing toolbar 815 with a variety of editing tools which may be utilized to build a slide for a slideshow. The graphic editing interface 800 may additionally include a preview panel 810, which may depict a preview of each of the slide in the slideshow. In some embodiments, the graphic editing interface 800 may display one slide at a time in an editing region, such as slide one 801.

The example slide one 801 includes slide one content 807, such as the slide one title. Further, slide one 801 may be edited to include a playable media object 805. Playable media object 805 may include a video file, an animation, an enhanced movable image, an audio file, or the like. According to some embodiments, a user may append or otherwise include the playable media object 805 by utilizing the editing toolbar 815, directly dragging a file onto the interface, or the like. The playable media object 805 may be incorporated into the slide one 801 from various sources, either locally on the same device as the graphic editing interface 800, or from remote sources.

FIG. 8B depicts the graphic editing interface 800 as it is utilized to generate the second slide 802 of the slideshow. Similar to FIG. 8A described above, graphic editing interface 800 may present a preview panel 810, which will depict the second slide to be selected when slide two 802 is being edited within the graphic editing interface 800. As depicted, slide two 802 may include different content than slide one 801. For example, slide two 802 includes a different slide two title 808, as well as slide two text 809.

Slide two 802 may be edited by a user to include a playable media object 806. According to some embodiments, playable media object 806 may be the same as or similar to playable media object 805 from FIG. 8A in slide one 801. For example, a user may duplicate the playable media object 805 to incorporate the media item as playable media object 806 in slide two 802. As another example, the playable media object 806 may be a same file as playable media object 805, and may be obtained from a same source or a different source as playable media item 805. According to some embodiments, the playable media objects 805 and 806 may not be identical, but may be substantially similar so as to ben determined to correspond to a same media item. As an example, the playable media object 805 and the playable media object 806 may correspond to a same media object, but may differ slightly. As an example, the files may originate from different sources, the metadata may be slightly different, running times of the two items may be slightly different, and the like. Further, according to some embodiments, the playback characteristics of the media items in slide one 801 and slide two 802 may be different. As depicted, the playable media object 805 is edited into slide one 801 to be presented in a larger format than playable media object 806 of slide two 802.

As described above, either during the editing mode, and/or during the playback mode, a determination may be made as to whether the first playable media object 805 and the second playable media object 806 correspond to a same media item. That is, the determination that the two playable media objects correspond to a same media object may be made during the editing mode, or may not be made until presentation mode, such as when the slideshow is presented, upon presentation of slide one 801, upon presentation of slide two 802, and the like. In some embodiments, the presentation module 165 may determine that the playable media object 805 and the playable media object 806 correspond to a same media object based on one or more various heuristics. As an example, characteristics of the first playable media object 805 and second playable media object 806 may be compared to determine whether a similarity of the two media objects satisfies a similarity threshold as to determine that they correspond to a same media item. Example characteristics may include, for example, file names, duration of the media, file hashes, metadata, and the like.

If it is determined that playable media object 805 and playable media object 806 correspond to a same media item, then the first playable media object 805 and the second playable media object 806 may be matched during a presentation mode as will be described below with respect to FIGS. 9A-9B.

FIGS. 9A-9B depict series of slides as generated by graphic editing interface 800. Specifically, FIGS. 9A-9B depict embodiments of the presentation mode of presentation module 145 in which playable media object 805 and playable media object 806 are matched.

FIG. 9A depicts a series of frames of the slideshow at different times during the presentation. The first frame 905 depicts slide one 801 at the first time. As shown, playable object 901A is just beginning to play. As described above, the media item played in the presentation mode may begin with the playable media object 805, along with the playback characteristics associated with playable media object 805 as indicated during the editing mode. Second frame 910 depicts the same slide one 801 at a second time. As depicted, the playable media object 901B is now at a second point in playback. This is made apparent by the figure of a person running towards the ball who is now closer to the ball in second frame 910 than depicted in playable object 901A in first frame 905.

At 915, user input is received which causes the slideshow to advance to the next slide. According to one or more embodiments, the user input could be any indication that the slideshow should proceed to a next slide in a predetermined order, such as a click of a mouse or other user input device, predetermined gesture, or the like. Further, in one or more embodiments, the indication to proceed to the next slide may not rely on user input, for example if the slideshow has defined a particular duration for slide one 801.

Third frame 920 depicts slide two 802 once the slideshow has been advanced to slide two 802 from slide one 801. For purposes of the example, the presentation module 145 has determined that the playable media object 805 and the playable media object 806 correspond to a same media object. As such, the same media object is matched in accordance with the playback of the slideshow. As such when slide one 801 depicted in second frame 910 transitions to slide two 802 depicted in third frame 920, the playable object 901B is configured to transition to playable object 901C such that a same media item corresponding to playable media object 805 and playable media object 806 appear to be played continuously across the two slides. Notably, the presentation characteristics for the media item in slide one 801 and slide two 802 may differ. As shown, playable object 901B differs from playable object 901C in that playable object 901C is configured to be presented in a smaller configuration than playable object 901B. According to some embodiments, playable media object 806 may be replaced by playable media object 805 in slide two 802 during the presentation, such that when presented in association with slide two 802, the playback characteristics of playable object 805 may be modified to match the configured characteristics of playable object 806. In some embodiments, a timestamp for playable object 901B may be obtained when the slide is transitioned such that playable object 901C can begin at the same time playable object 901B ceased playing. Further, in some embodiments, one or more of playable media object 805 and playable media object 806 may be modified to provide a transition between the two playable media objects. For example, in the example presented, a presentation state of the playable objects 901B maybe transitioned into a presentation state of playable object 901C, for example the frame of the playable object may shrink down to the frame of playable object 901C. Similarly, the difference in playback characteristics associated with the playable media objects across frames may be utilized to generate transitional playback frames of the playable media object when the slideshow is advanced. Although not depicted, if the user input is received after the playable object has concluded, then the playable object may be ignored in the following slide such that it is not played, in accordance with some embodiments. In other embodiments, if the user input is received after the playable object has concluded, then the playable object may begin from the beginning upon presentation of the slide.

FIG. 9B depicts a series of frames of the slideshow in an example embodiment in which a transition animation is utilized between two consecutive frames of the presentation. According to some embodiments, when a presentation is configured to include the transition animation between two frames, and the two consecutive slides include a same media item (e.g., the two slides have media items determined to be the same, as described above), the media item may be incorporated into the transition such that the media item plays throughout the transition.

The figure begins with a first frame 925 of the slideshow that includes slide one 801 at a first time. Similar to FIG. 9A, when the presentation begins, the playable object 805 begins playing within slide one 801. As such, the person running to the ball appears at the very left side of the slide for purposes of this example. At 930, user input is received to proceed to the next slide. According to some embodiments, the instruction to advance to a next slide may not require user input, for example if the slideshow was configured to present slide one 801 for a predetermined length of time.

In response to the user input to advance to slide two 802, a transitional animation may be triggered. For purposes of the example, the transition animation may include a swipe action, as depicted in transitional frame 935. According to one or more embodiments, the playable media object 805 and the playable media object 806 may be matched such that the media item corresponding to the two playable objects are presented on the two consecutive slides to play continuously. According to some embodiments, the playable object 902 may continuously play through the transition. In some embodiments, the playable object 902B may be incorporated into the transition animation as an active component, such that the media item continues to play during the transition. As such, playable object 902B would continue to show the person running towards the ball as slide two swipes in to replaced slide one. According to some embodiments, because the media item is configured to be presented on the two consecutive slides, and some frames of the transition between the two slides, two instances of the media item may be visible.

Third frame 940 depict slide two 802 at a third time after the transition takes place. As shown, the playable object 902C continues to play from a same playback location at which playable object 902B was presented at the time playable object 902C became visible. Accordingly, an audience member viewing the presentation would perceive playable media objects 805 and playable media object 806 to be a single media object which plays continuously across the first frame 925, the transitional frame 935, and the third frame 940.

FIG. 10 is a flow diagram illustrating a method for editing a slideshow presentation using an electronic device in accordance with some embodiments. Method 1000 is performed at a device (e.g., 100, 200, 300) with a display. Some operations in method 1000 are, optionally, combined, the orders of some operations are, optionally, changed, and some operations are, optionally, omitted.

As described below, method 1000 provides an intuitive way for editing a slideshow presentation. The method reduces the cognitive burden on a user for modifying presentation of playable media items on consecutive slides according to a match, thereby creating a more efficient human-machine interface. For battery-operated computing devices, enabling a user to modifying presentation of playable media items on consecutive slides according to a match faster and more efficiently conserves power and increases the time between battery charges. The method also provides an efficient manner for defining rules governing presentation of an operation.

The flowchart begins at 1002, where the presentation module displays a slideshow editing user interface. The slideshow editing user interface may allow a user to build a slideshow for presentation. The slideshow editing user interface may allow the user to edit the slideshow to create a set of slides for a presentation. According to some embodiments, the slideshow may contain a series of ordered deterministic operations. In some embodiments, the slideshow editing user interface may be utilized to define the ordered operations. An example of ordered operations may include a presentation of the particular slide, followed by presentation of text on the slide, followed by the presentation of an animation on the slide, followed by presentation of a next slide, in accordance with various criteria.

The flowchart continues at 1004, where the presentation module receives user input via their slideshow editing user interface, causing a first operation to be added to the slideshow. The first operation can be, for example, text, graphics, or other media which is presented as part of one or more slides in the slideshow.

The flowchart proceeds to block 1006, where the first operation is configured to be performed when the first criteria is met based on a first presentation status of the prior operation of slideshow. As an example, the prior operation of the slideshow may be presentation of the particular slide on which the first operation is added, presentation of a graphic or animation that is configured to be displayed for some amount of time prior to the first operation, and the like. As such, in some embodiments, the first criteria is based on a first presentation status of one or more other operations of the slideshow.

The flowchart continues to 1008, where the first operation is caused to be configured to be performed when a second criteria is met. Said another way, the first operation may be linked to two triggering events based on two separate criteria. As shown, in block 1010, the second criteria can be caused to be defined as the second presentation status of the prior operation of the slideshow when a predetermined user input is received. As an example, if the first operation is a text box that is configured to be presented when a video that is presented preceding the text box is complete (e.g., the first criteria), the first operation can also be configured to be performed when the video is still playing, if a predetermined user input is received (e.g. the second criteria, which was not defined by the user). As such, the second criteria may be independent of a presentation status of the previous operation, or may be related to a different presentation status of the previous operation than that of the first criteria.

The flowchart concludes at block 1012, where the presentation module 145 optionally causes the prior operation to be configured to be performed regardless of the presentation state of the first operation. Said another way, going back to the example above, the video that precedes the presentation of the text box may be configured to play through its entire duration regardless of whether the predetermined user input is received and, thus, the text box is presented. As such, the text box may be presented while the video is still playing, and the video may still play through its entire duration concurrently with presentation of the text box.

Although not shown, the slideshow may be edited to include a second operation based on the present station state of the first operation. The second operation may be configured to be performed in response to the third criteria (e.g., the first presentation state of the first operation). As such, an additional operation of the slideshow maybe performed in accordance with the presentation state of a previous operation, regardless of the presentation state of other operations. Further, the second criteria may be more complex. As an example, the second criteria may be based on a presentation state, elapsed time, and/or other a combination of other factors to determine whether the predetermined user input causes the first operation to initiate.

FIG. 11 is a flow diagram illustrating a method for modifying a presentation of a slideshow using an electronic device in accordance with some embodiments. Method 1100 is performed at a device (e.g., 100, 200, 300) with a display. Some operations in method 1100 are, optionally, combined, the orders of some operations are, optionally, changed, and some operations are, optionally, omitted.

As described below, method 1100 provides an intuitive way for modifying presentation of a slideshow. The method reduces the cognitive burden on a user for building a set of user defined actions that may be modified in presentation mode, thereby creating a more efficient human-machine interface. For battery-operated computing devices, enabling a user to modifying presentation of playable media items on consecutive slides according to a match faster and more efficiently conserves power and increases the time between battery charges. The method also provides an efficient manner for defining rules governing presentation of an operation.

The flowchart begins at 1102, where the presentation module 145 initiates display of a slideshow comprising a set of ordered operations each associated with initiating criteria. In one or more embodiments, the display of the slideshow is initiated in response to a user input triggering a presentation mode of the presentation module 145. According to some embodiments, the presentation mode presents the slideshow in a user interface without editing tools. Further, in some embodiments, the presentation mode activates various criteria for the operations within the slideshow based on various criteria.

The flowchart continues at 1104, where the presentation module 145 initiates a first operation of the set of ordered operations of the slideshow. In one or more embodiments, the presentation module 145 may initiate a first operation based on presentation logic or criteria associated with the first operation. As an example, the first operation may be presented based on the criteria corresponding to a presentation mode of the previous operation, such as content within the slide or presentation of the slide.

The flowchart continues to 1106, where the presentation module 145 receives a user input overriding initiating criteria for a second operation of the ordered operations. As described above with respect to FIG. 10, the second operation may be associated with two or more initiating criteria. In some embodiments, each initiating criterion may be associated with a different presentation status of a previous operation in the ordered operations, or may be independent of any status of any previous operation in the ordered operations.

In some embodiments, whether the user input to override the initiating criteria is active for a particular operation may be an additional criterion considered by the presentation module 145. That is, in response to receiving the user input to override the initiating criteria for the second operation, a determination may be made that the ability to override the initiating criteria via user input is active. As shown at block 1108, a determination may be made whether the overriding capability is activated. In some embodiments, the overriding capability may be activated for a particular operation, based on operations associated with a particular slide, or maybe associated with all operations across a slideshow.

If a determination is made at block 1108 that the overriding capability is activated, then the flowchart continues to 1110, where the presentation module 167 initiates the second operation based on the user input regardless of the initiating criteria for the second operation. That is, the second operation may be configured to be performed in association with a particular state of one or more previous operations. The overriding capability triggers initiation of the operation based on a different presentation state of one or more previous operations. For example, the initiating criteria may indicate that a preceding operation must be complete for the second operation to initiate. The overriding capability may be associated with a different criterion for the second operation. As an example, the second operation may be initiated if the preceding operation is active, but not necessarily if the preceding operation is complete. In some embodiments, the overriding capability may modify the criteria used for determining initiation of the second operation regardless of a presentation state of a previous operation in the set of ordered operations.

The flowchart continues to block 1112, where the presentation module 145 completes the first operation concurrently with activation of the second operation in some embodiments. Returning to the example described above, if the second operation is initiated during presentation of the preceding operation but prior to completion of the preceding operation, the second operation may initiate concurrently with presentation of the preceding operation such that the preceding operation continues after the second operation is initiated.

Returning to block the 1108, if a determination is made that the overriding capability is not activated, then the flowchart continues to block 1114, where the presentation module 145 monitors the slideshow for initiating criteria for the second operation. As described above, the initiating criteria may be the criteria that does not involve the predetermined user input that triggers the overriding capability. For example, the initiating criteria for the second operation may be based on the particular presentation state of the preceding operation. The flowchart continues to block 1116, where the presentation module initiates the second operation based on the initiation initiating criteria for the second operation.

The flowchart concludes at block 1118, where the presentation module 145 monitors the slideshow for an initiation criterion for the third operation of the order operations in accordance with the activation of the second operation. Said another way, in some embodiments, the third operation may be associated with and initiating criteria based on the presentation status of the second operation. Regardless of whether or not the first operation is continuing to be presented, the third operation will be initiated based on the predefined criteria associated with the presentation state of the second operation.

module 145 monitors the slideshow for initiating criteria for the second operation. As described above, the initiating criteria may be the criteria that does not involve the predetermined user input that triggers the overriding capability. For example, the initiating criteria for the second operation may be based on the particular presentation state of the preceding operation. The flowchart continues to block 1116, where the presentation module initiates the second operation based on the initiation initiating criteria for the second operation.

The flowchart concludes at block 1118, where the presentation module 145 monitors the slideshow for an initiation criterion for the third operation of the order operations in accordance with the activation of the second operation. Said another way, in some embodiments, the third operation may be associated with and initiating criteria based on the presentation status of the second operation. Regardless of whether or not the first operation is continuing to be presented, the third operation will be initiated based on the predefined criteria associated with the presentation state of the second operation.

FIG. 12 illustrates an exemplary user interface for modifying presentation playback using an electronic device in accordance with some embodiments. The user interfaces in these figures are used to illustrate the processes described above, for example the processes in FIGS. 10-11.

FIG. 12 depicts graphic editing interface 1200 by which a slideshow presentation may be generated. The graphic editing interface 1200 includes an editing toolbar 1205, which may be utilized to add various actions to a particular slide. According to some embodiments, the user defined actions may appear on a slide simultaneously, for example when the slide is presented. In some embodiments, various user-defined actions may be presented in a particular order as defined by a user. For purposes of the example, graphic editing interface 1200 includes an action order panel 1210, which depicts an order in which user defined actions are presented on the particular slide.

For purposes of the example presented in FIG. 12, a slide one 1201 is depicted as being edited within graphic editing interface 1200. Slide one 1201 includes several content items, whose appearance on the slide during a presentation mode are defined by user defined actions. The various content items include a moving object 1202, a bullet one 1203, and a bullet two 1204. Turning to the action order panel 1210, it is depicted that the first user-defined action 1212 includes the moving objects 1202 moving across the slide. The second user-defined action 1214 is depicted as including the appearance of bullet one 1203. The third user-defined action 1218 is depicted as including the appearance of bullet two 1204.

According to some embodiments, the proscribed user-defined action order may be linear, or maybe associated with one or more heuristics which may be dynamically modified during presentation mode and order in which the user divine actions are presented. According to one or more embodiments, the proscribed user-defined action order may be interrupted or otherwise modified during a presentation mode by a predefined user input. An example of a user input triggering an overriding capability might be a click of a mouse or other user input device, as depicted at 1222. According to one or more embodiments, the overriding capability may be global, and/or maybe dependent on the particular action. As depicted, some embodiments allow a user input component 1222 to indicate whether an overriding capability is activated. According to some embodiments, the overriding capability may provide the capability for a user to advance to a next user-defined action in a set of actions for a slide or slideshow regardless of the state of the current action. In some embodiments, the overriding capability may allow individual user-defined actions may be associated with various heuristics which may or may not allow for user-defined modification of the user-defined actions during presentation mode. The overriding capability may be based on one or more criteria to initiate a particular user-defined action. As shown, the second user-defined action 1214 (corresponding to the appearance of bullet one 1203) is associated with a user input component 1216 which indicates that an overriding capability is activated for that slide. In some embodiments, the affirmative user input at user input component 1216 indicates that if the predetermined user input is received during presentation mode of the first user-defined action 1212 corresponding to the overriding capability, then the second user-defined action 1214 may be initiated regardless of the completion of the first user-defined action 1212. Said another way, if the moving object has not yet reached its configured conclusion, and user input is received to trigger the overriding capability, then the presentation of bullet one 1203 will be triggered while the moving objects 1202 is still moving across the screen.

According to some embodiments, the overriding capability may be more complex. As an example, user-defined action 1218, which includes the presentation of bullet two 1204, is not configured to allow the overriding capability as shown at input component 1220. As such, for purposes of this example, the overriding capability is not active for the third user-defined action 1218. Thus, the moving object 1202 must reach its intended conclusion, and bullet one must be presented prior to bullet two 1204 being presented. Although not shown, more advanced heuristics may be proscribed by a user on the global basis and/or on an action-by-action basis. Further, in some embodiments, the overriding capability may be active or inactive according to a context of the presentation. An example may include that an overriding capability may be allowed during animations, but not during playback of video files. Said another way, in some embodiments, the criteria for determining whether a next up user-defined action may be initiated may be based on a context of the presentation of the slide and/or the content of the slide being presented, such as playback status of media types, content types, and the like.

FIG. 13 depicts two example flow diagrams of the presentation of slide one 201 as it was generated and graphic editing interface 1200. The two example flow diagrams include a build flow 1305, in which no user input is received to override an initiating criteria of a next user-defined action. Modified flow 1310 depicts an example flow diagram of presentation of slide one 201 utilizing user input to override an initiating criteria for the next user-defined operation.

Build flow 1305 depicts the flow of the presentation of content items 1202, 1203, and 1204 as defined by the identified action order as depicted in action order panel 1210. Accordingly, build flow 1305 begins with frame 1301A in which slide one 1201 is depicted with moving object 1302A moving across the screen as defined in user-defined action 1212. The flow diagram continues at frame 1301B, where in the moving object 1302B reaches its intended conclusion point on the right side of the slide. As defined by the user defined actions shown in action order panel 1210, the flow diagram proceeds to frame 1301C, in which slide one 1201 presents the bullet one 1303 in response to the moving object 1302B reaching its conclusion. That is, the initiating criteria for the presentation of bullet one 1303 is defined as the conclusion of the movement of moving object 1302B. The flow diagram proceeds at frame 1301D, where the slide one 1201 presents the second bullet 1304 based on the initiating criteria of the third user-defined action 1218 as the presentation of bullet one 1303.

Turning to modified flow 1310, the flow diagram is presented which depicts the presentation flow of the various components of slide one 1201 utilizing the overriding capability as configured in action order panel 1210 of the graphic editing interface 1200. Accordingly, the initiating criteria of user-defined action 1214 is configured to allow the overriding capability based on a predetermined user input. By contrast, the user-defined action 1218 is not configured to allow the overrating type capability based on a predetermined user input.

The modified flow 1310 begins at frame 1311A, where slide one 1201 is depicted with moving object 1312A moving across the slide. At 1315, the predetermined user input is received while the moving object 1312A is moving across the screen. As described above with respect to FIG. 12, the second user-defined action is configured to activate an overriding capability in response to a predetermined user input. As such, the initiating criteria of user-defined action two (e.g., the conclusion of the movement of moving object 1312A) may be overridden based on the user-defined input. As such, in response to the user-defined input, the second user-defined action may initiate regardless of the state of the current user-defined action and/or a configured initiating criteria of the second user-defined action 1214. Accordingly, the flow diagram 1310 proceeds to frame 1311B, where the bullet one 1313 is presented while moving object 1312B continues to move across the slide.

The flow diagram proceeds to 1320, where user input is received. The user input may be the predetermined user input described above with respect to 1315. However, as shown in action order panel 1210, the third user-defined action 1218 (e.g., the presentation of bullet two 1204) is not configured to accept the overriding capability of the predetermined user-defined action, as shown by the lack of affirmative selection of easier input component 1220. Accordingly, returning to FIG. 13, when user input is received at 1320, the user input may be ignored. Accordingly, the flow diagram continues to frame 1311C, where bullet one 1313 is presented while moving objects 1312C continues to move across the frame, but the third user-defined action is not initiated in response to the received input. The flow diagram concludes at frame 1311D, where the moving objects 1312D reaches its conclusion point on the right side of the slide. In response, bullet two 1314 is presented as defined by user-defined action three 1218 of FIG. 12.

FIG. 14 depicts a flowchart of a technique for temporarily selecting a visually obscured object and a graphical editing interface according to some embodiments. Method 1400 is performed at a device (e.g., 100, 200, 300) with a display. Some operations in method 1400 are, optionally, combined, the orders of some operations are, optionally, changed, and some operations are, optionally, omitted.

As described below, method 1400 provides an intuitive way for modifying an ordered presentation of user-defined actions during a presentation mode. The method reduces the cognitive burden on a user for providing a dynamically modifiable presentation, thereby creating a more efficient human-machine interface. For battery-operated computing devices, enabling a user to generate modifiable user-defined actions faster and more efficiently conserves power and increases the time between battery charges.

The flowchart begins at 1405, where the graphic editing interface is displayed with layered objects and a selection component. According to one or more embodiments, the layered objects include two or more graphical objects overlaid on the same or similar location in the user interface. The selection component provides an interface for selecting one or more of the layered objects for editing or manipulation purposes. In some embodiments, the selection component may include representations of each object in a set of layered objects. For example, the selection component may present a preview of each layered object, a textual description of each layered object, and the like. Further, the representations of each object may be presented in a selectable manner such that each object may be selected based on user input. The objects may be ordered in the selection component, for example, based on the layered ordering of the objects such that the top object in the layered objects is listed at the top or in a leading position in the selection component, such as on top or in a left-most position in the selection component. Further, in some embodiments, the selection component may only include representations of the visually obstructed objects for temporary selection, and may not include the top object which can be selected without a selection component. Selection may be performed, for example, by selecting a particular representation of the object in the selection component, selecting an object from a drop-down menu, and the like. Further, in some embodiments, two or more objects may be selected at the same time using the selection component such that all selected objects may be manipulated.

The flowchart proceeds to 1410, where user input is received directed to a first location of the interface where a second object is visually obstructed by a first object. For example, a cursor may be placed and utilized for user input on a location on the user interface over which two or more objects are located, where at least one of the objects is obscured by another object. For another example, a touch-sensitive surface detects user input (e.g., a tap gesture from a user tapping the touch-sensitive surface with a finger) at the location and determines that the user input is a tap gesture.

The flowchart proceeds to 1415, where user input is received directly to the selection component for temporary selection of the second object. According to some embodiments, the selection component may include a menu, listing, or other device by which the layered one or more objects may individually be selected. As such, the abstract visually obstructed second object may be selected in the selection component. In some examples, the user input (e.g., a mouse click or a tap gesture) is detected at a location corresponding to a representation of the second object within the selection component.

The flowchart continues to 1420, where the graphic editing interface transitions into a temporary selection mode in accordance with the received user input. According to some embodiments, temporary selection mode is triggered in response to selection of a visually obstructed object via the selection component. As will be described below, temporary selection mode is associated with one or more criteria which, when satisfied, cause the selected visually obstructed object to continue to be selected, and or to cease to be selected. For example, in a temporary selection mode, the temporarily selected object may be selected for a predetermined time period, a predetermined number of user inputs, until a user provides user input at a predetermined location or outside a predetermined location of the graphic editing interface, and the like.

In accordance with the user input directed to the selection component for temporary selection in the graphic editing interface, and transition into the temporary selection mode, the flowchart continues to 425, where the second object is selected. According to some embodiments, the second object is temporarily selected in accordance with the one or more criteria associated with the temporary selection. In addition, at 1430, a visual identifier is presented in association with the obstructed object indicating the obstructed object is temporarily selected. The visual identifier may be presented in the selection component, and/or in association with the selected second object in the graphic editing interface.

FIG. 15 depicts a flowchart for utilizing a temporary selection mode in accordance with some embodiments. Method 1500 is performed at a device (e.g., 100, 200, 300) with a display. Some operations in method 1500 are, optionally, combined, the orders of some operations are, optionally, changed, and some operations are, optionally, omitted.

As described below, method 1500 provides an intuitive way for modifying an ordered presentation of user-defined actions during a presentation mode. The method reduces the cognitive burden on a user for providing a dynamically modifiable presentation, thereby creating a more efficient human-machine interface. For battery-operated computing devices, enabling a user to generate modifiable user-defined actions faster and more efficiently conserves power and increases the time between battery charges.

The flowchart begins at 1505, where user input is received directed to a first location of the interface where a second object is obstructed by a first object. The flowchart continues to block 1510, where user input is received to perform an operation on a selected object of a set of layered objects at the first location. For example, user input may be received to manipulate a selected component. As an example, an editing tool may be selected from the editing toolbar to manipulate the selected object in accordance with the selected tool. That is, a user may provide user input into the graphic editing interface to select a tool which causes an action corresponding to the tool to be applied to a selected object. As another example, a select and drag action may be used on the selected object such that user input at a location corresponding to the temporarily selected object is used to select the object, and movement of the user input across an editing region causes the temporarily selected object to be moved.

The flowchart continues to block 1515, where determination is made as to whether temporary selection criteria is satisfied. The temporary selection criteria may be associated with determining whether an obstructed object remains temporarily selected. For example, the temporary selection criteria may be associated with determining whether a predetermined amount of time has passed since the obstructed object was temporarily selected in the selection component, whether a predetermined number of user inputs have been received since the obstructed object was selected in the selection component, and the like. If the temporary selection criteria is determined to be satisfied at 1515, then the flowchart continues to 1520, where the temporarily selected object is identified from the selection component. Then at block 1525, the first visual indication is presented for the temporarily selected object. The flowchart optionally concludes at 1530, where the operation is performed on the temporarily selected object.

Returning to block 1515, if a determination is made that the temporary selection criteria is not satisfied or is no longer satisfied, then the flowchart continues to block 1535, where it is determined whether one or more additional criteria are satisfied. In some embodiments, the additional criteria may be that the temporary selection criteria is no longer satisfied. In some embodiments, the additional criteria may have additional considerations or requirements as to a next selection of an object from a set of layered objects. In accordance with a determination that the additional criteria is satisfied, the flow chart continues to 1540, where a second visual indication is presented for the first object. As such, if it is determined that the second object is no longer temporarily selected, then the selection of the location that includes the layered objects will cause the unobstructed first object to be selected. In addition, a visual indication may be presented in association with the first object in the selection component and/or with the first object in the graphic editing interface. The second visual indication may differ from the first visual indication to signal that the second visual indication is not associated with a temporary selection. As such, selection of the first object is not associated with temporary selection criteria in accordance with some embodiments. The flowchart concludes at 1525, where the operation is performed on the first object.

FIGS. 16A-16G illustrate an exemplary user interface for providing temporary selection of layered objects in accordance with some embodiments. The user interfaces in these figures are used to illustrate the processes described above, for example the processes in FIGS. 14-15.

Figure 16A:
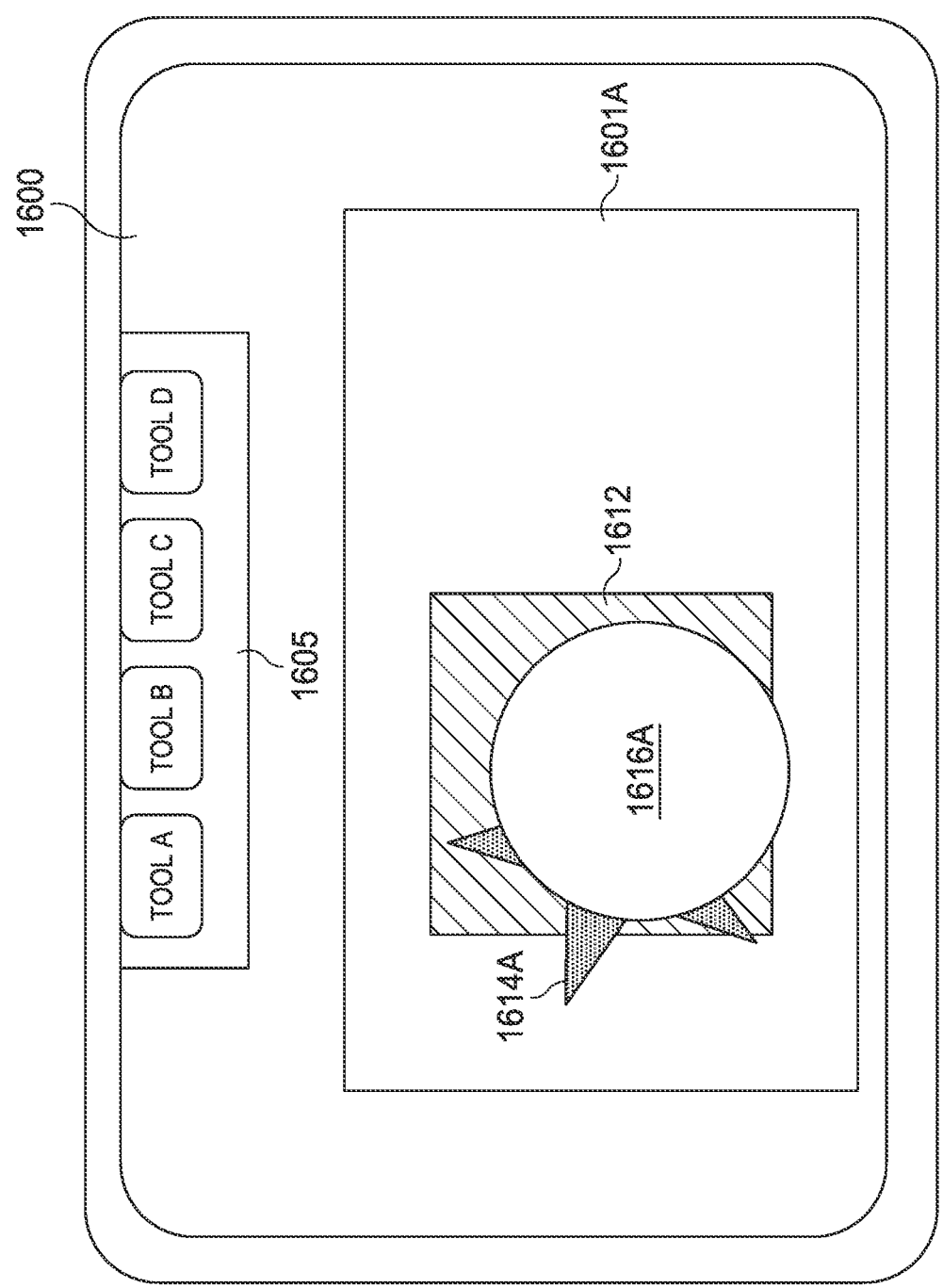
FIGS. 16A-G illustrate example user interfaces for utilizing a temporary selection mode in accordance with some embodiments.

FIG. 16A depicts the graphic editing interface 1600 comprising an editing region 1601A in which a set of layered objects are presented for editing. The graphic editing interface includes an editing toolbar 1605 which may include selectable components which, when selected, cause one or more tools to be used to manipulate the various objects. The layered objects include a square 1612, a star 1614A, and a circle 1616A. The circle is depicted at the top of the layered objects, whereas the star 1614A and the square 1612 are visually obstructed by other shapes. For example, the star 1614A is obstructed by the circle 1616A. Similarly, the square 1612 is obstructed by both the star 1614A and the circle 1616A.

Figure 16B:
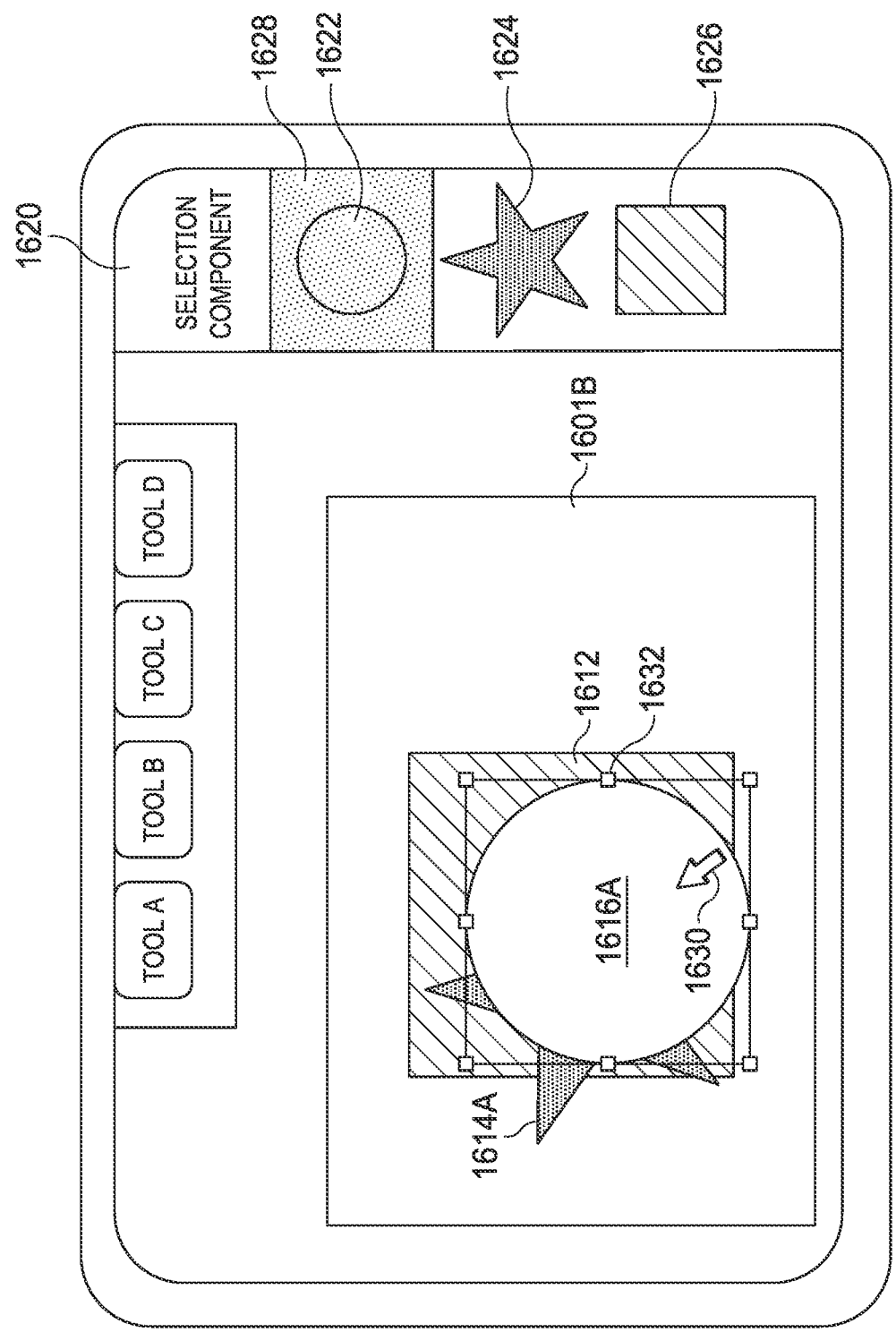

FIG. 16B depicts an initial user input utilizing a cursor 1630 at a location on the interface where the square 1612 and the star 1614A are obstructed by the circle 1616A. As shown, the initial user input causes the unobstructed object (i.e. the circle 1616A) to be selected. The selection of the circle is depicted utilizing a first visual indication 1632 in the editing region. Further, the user input at the first location may trigger the appearance of the selection component 1620, on which an indication of each of the available objects at the location may be presented. Accordingly, the selection component 1620 depicts a representation of each of the layered objects, including a representation of the circle 1622, a representation of the star 1624, and a representation of the square 1626. Because the initial selection causes the unobstructed object to be selected, the selection component 1620 depicts the representation of the circle 1622 to be selected based on the visual indication 1628 in the selection component (e.g., the shading presented over circle 1622 is displayed visually distinct from lack of shading over the star 1624 and the square 1626).

Figure 16C:
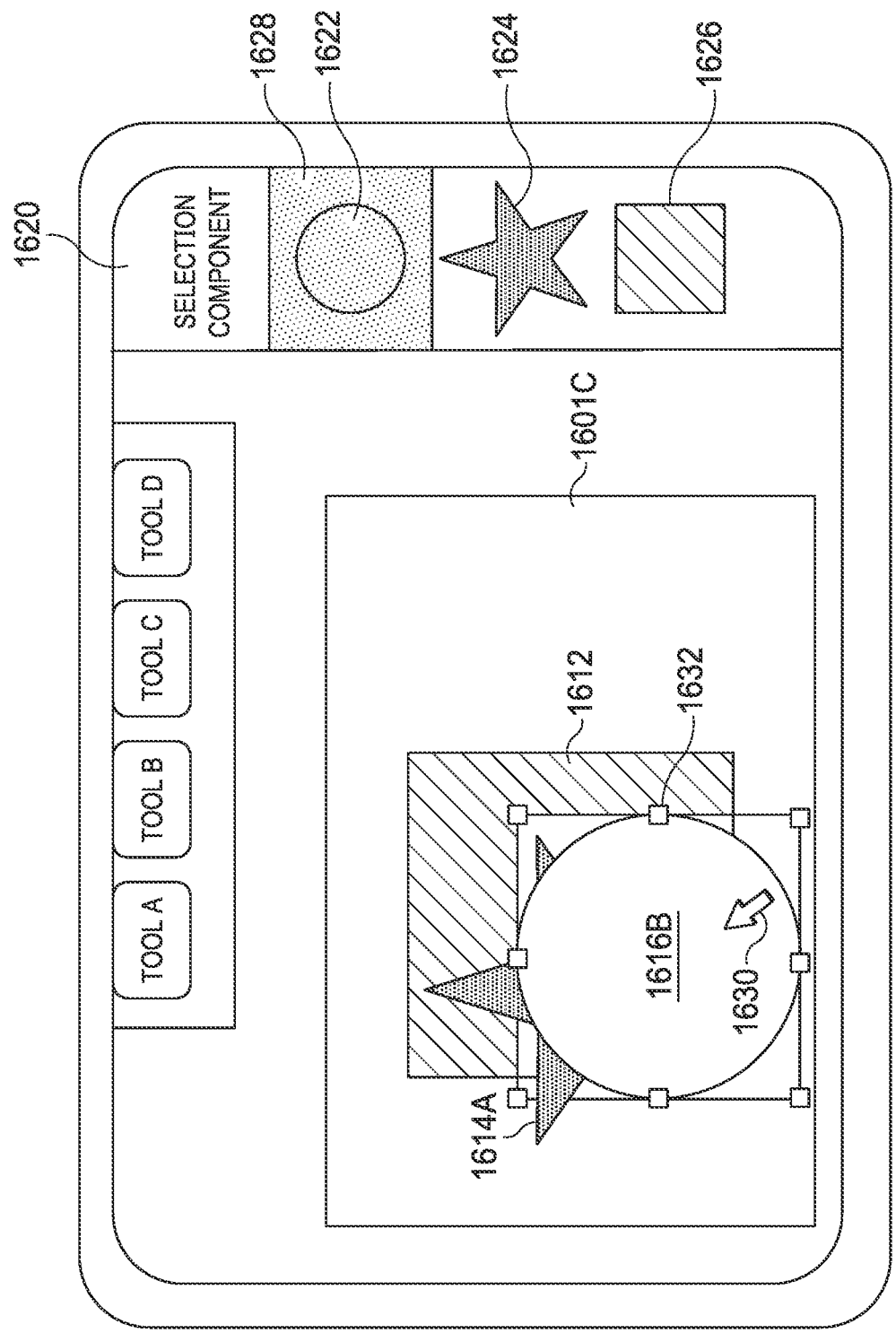

FIG. 16C shows the graphic editing interface 1600 being used to modify the circle 1616B in accordance with the selection. In this example, the user input is received at cursor 1630 on the visual indication within the editing region 1601C causing the selected circle 1616B to be selected and dragged to a new location in the editing region 1601C. As depicted, the selection component 1620 continues to show the representation of the circle in the selection components 1622 to be selected based on visual indication 1628.

Figure 16D:
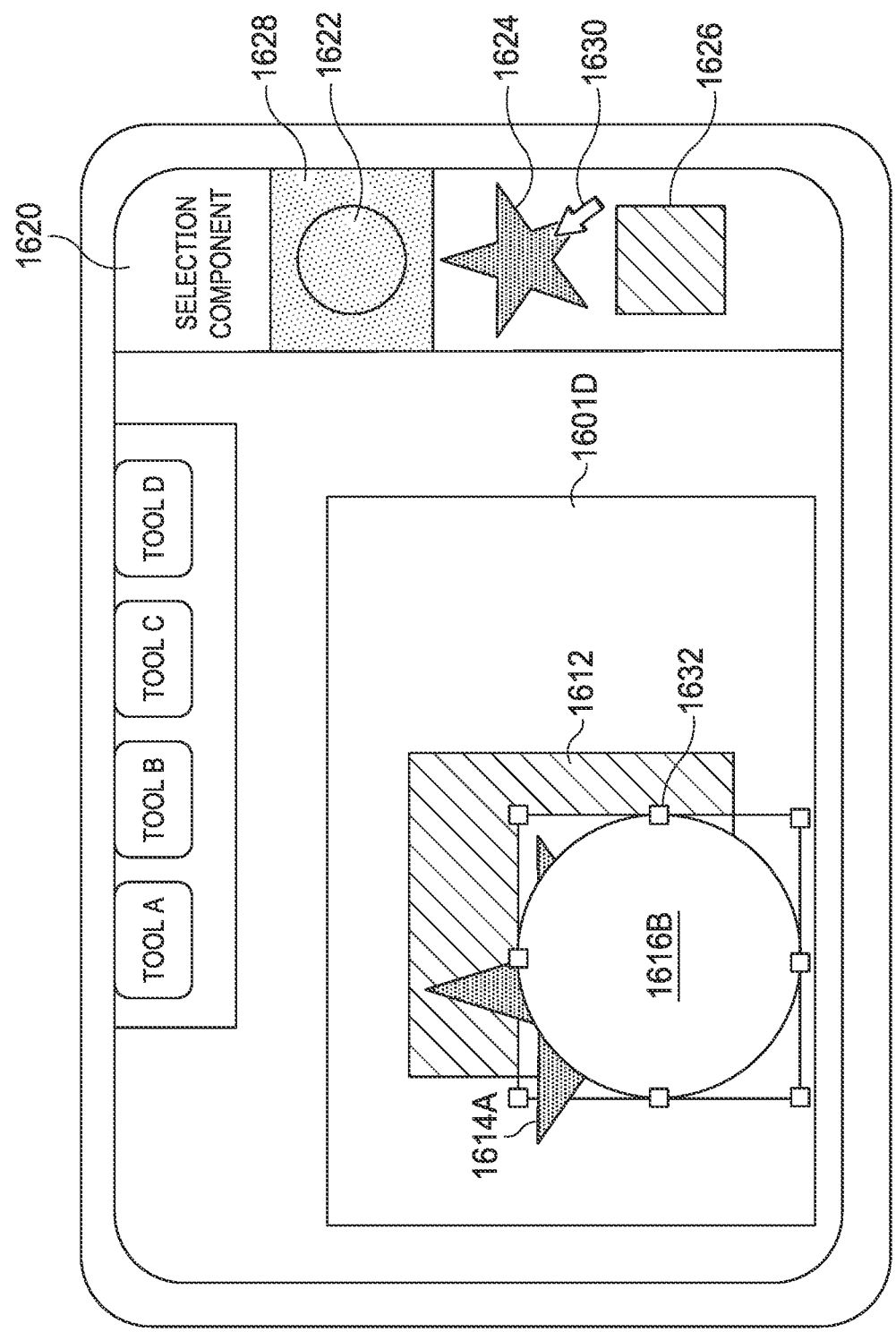

FIG. 16D shows the graphic editing interface 1600 being used to temporarily select a different object of the layered objects. In selection component 1620, the cursor 1630 is depicted as hovering over the representation of the star 1624. Notably, the star 1614A is one of the objects in the layered object that is visually obstructed by another object (e.g., circle 1616B).

Figure 16E:
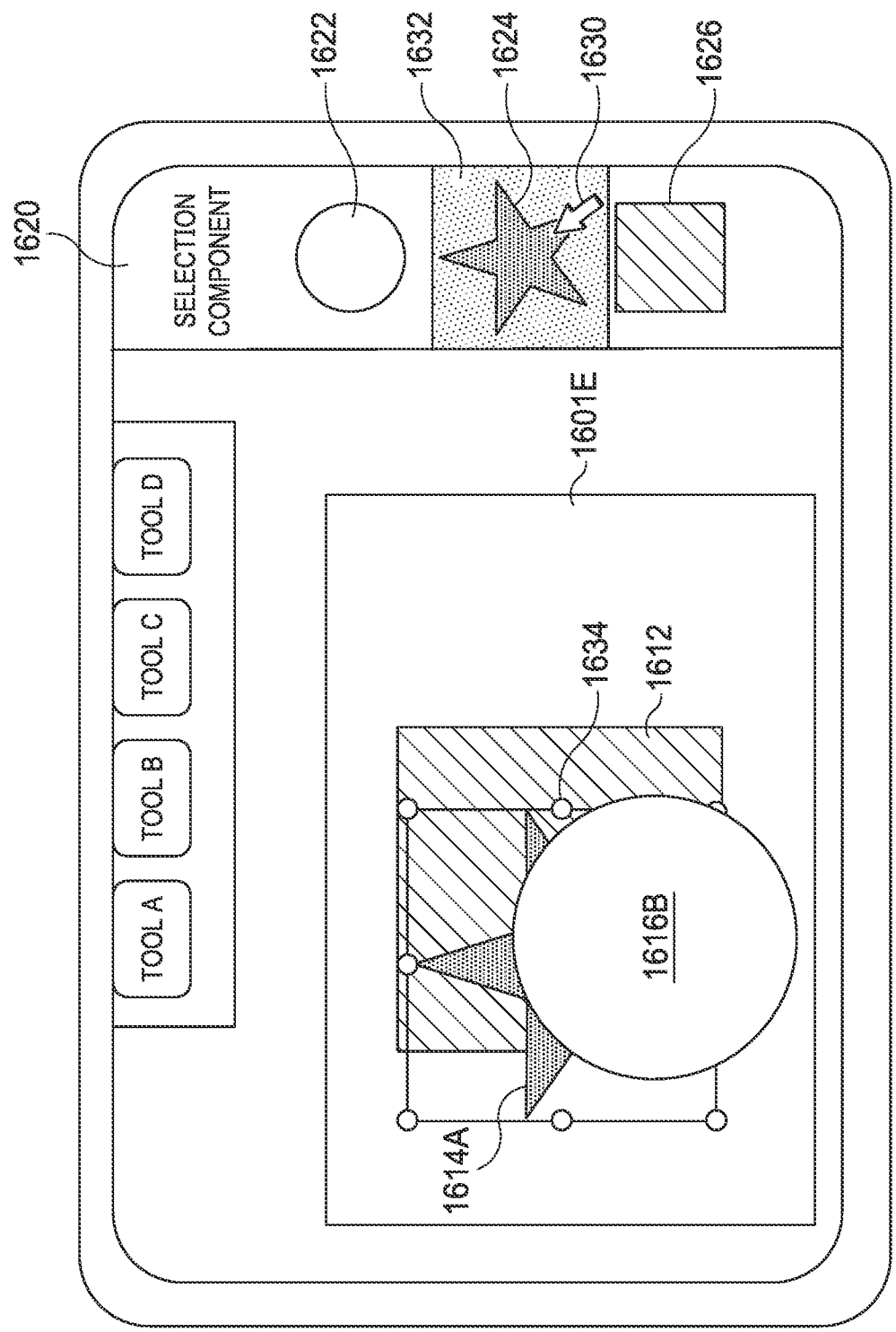

FIG. 16E depicts the graphic editing interface 1600 being used to temporarily select the visually obstructed object. Specifically, user input may be received in the selection component to select one of the visually obstructed objects. Here in this example, the cursor 1630 is used to provide user input to the location of the selection component associated with the star 1614A. In response to the user input, a second visual indication 1632 is presented in association with the representation of the star 1624 in the selection component 1620. In addition, a second visual indication 1634 is presented in association with the star 1614A in the editing region 1601E. According to some embodiments, the second visual indication 1632 in the selection component may differ from the first visual indication 1628 in the selection component because the second visual indication 1632 is associated with a temporary selection. Specifically, the first visual indication 1628 in the selection component 1620 shows a filled shaded selection, whereas the second visual indication 1632 in the selection component 1620 depicts a cross hatched shaded selection. The selection may be associated with a temporary selection when the selection is associated with a visually obstructed object represented in the selecting component 1620. Similarly, the second visual indication 1634 differs from the first visual indication 1632 to indicate that the star 1614A is temporarily selected. Specifically, the first visual indication 1632 in the editing region 1601 depicts an outline around the region of the selected shape with square-shaped handles, whereas the second visual indication 1634 in the editing region 1601 depicts an outline around the region of the selected shape with circle-shaped handles. Said another way, selection of the temporarily selected object may be associated with temporary selection criteria which determine whether the object remains selected, and the temporary selection may be visually indicated. By contrast, in FIG. 16B-16D, the circle 1616A is presented in the editing region in association with the first visual indication 1632 which differs from the second visual indication 1634 because the selection is not associated with temporary selection criteria.

Figure 16F:
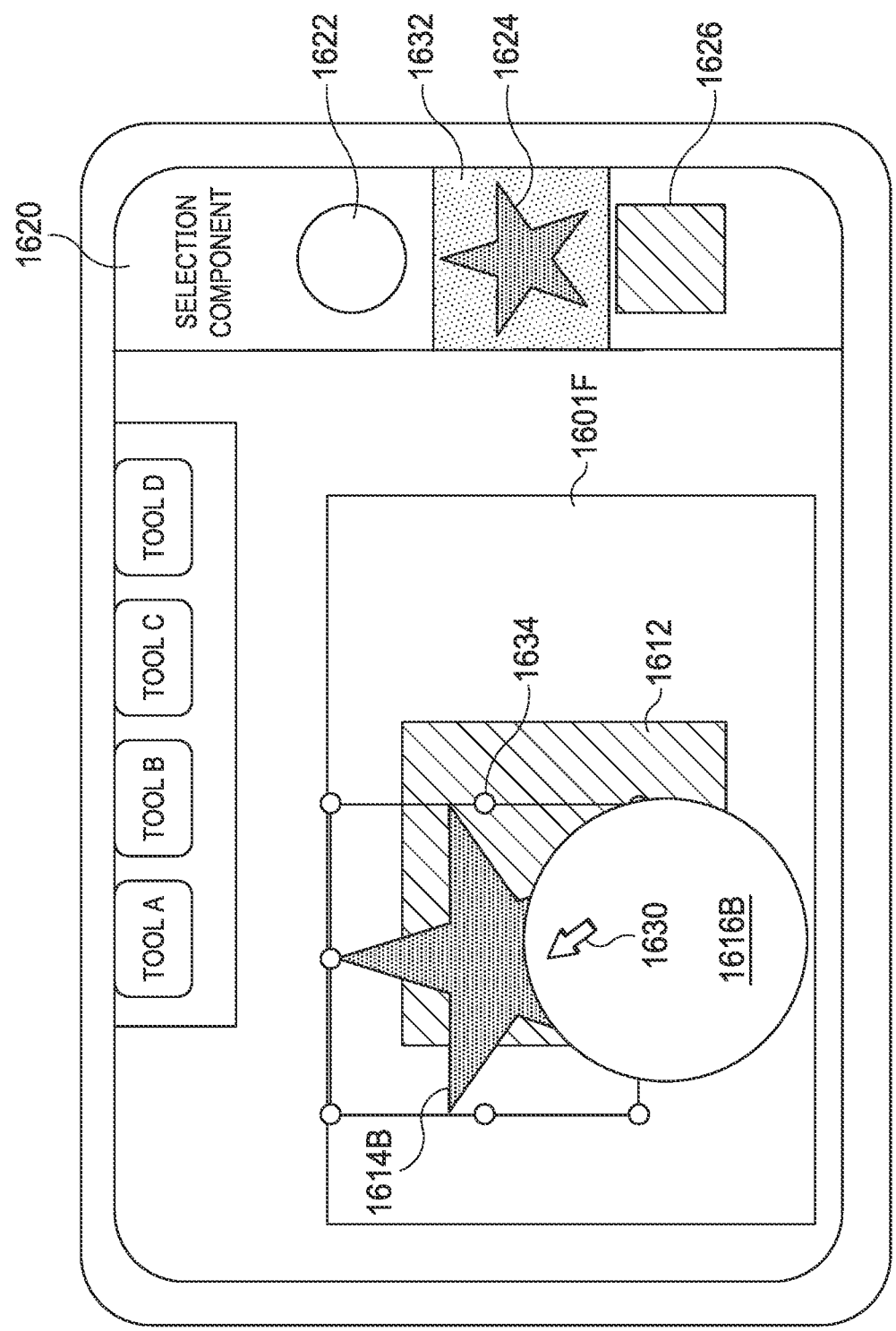

FIG. 16F depicts user input at the cursor 1632 to drag the selected star 1614B in the editing region 1601F. In addition, the selection component 1620 continues to show the representation of the star 1624 as temporarily selected. The temporary selection is visually depicted by the second visual indication 1632 which is visually different than the first visual indication 1628 to indicate that the selection is associated with temporary selection criteria. Specifically, for purposes of the example, the first visual indication 1628 depicts a filled shaded area over the circle in the selection component 1620, whereas the second visual indication 1632 depicts a cross hatched patterned region over the star 1624. Notably, the cursor is placed at a location on the editing region 1601F at which the circle is the top object in the layered objects. However, because the star 1616A is temporarily selected, a click and drag over the circle 1616B causes a click and drag action to be applied to the visually obstructed star 1614A.

Figure 16G:
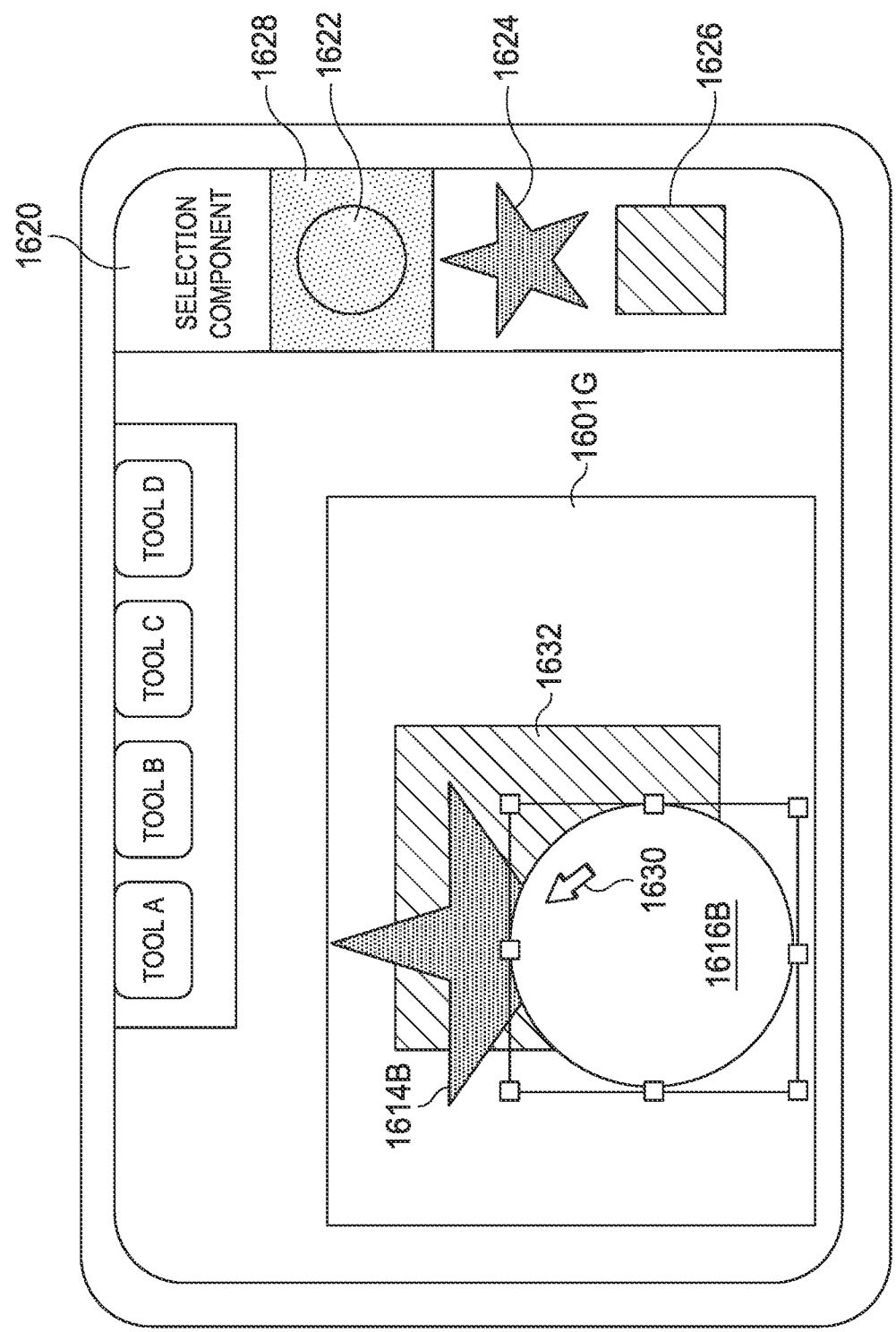

FIG. 16G depicts the graphic editing interface 1600 being utilized by a user providing user input by cursor 1630 at the location associated with the layered objects 1612, 1614B, and 1616B. For purposes of the example, the editing region 1601G depicts user input at the location when the temporary selection criteria is no longer satisfied. Accordingly, the input into the location causes the unobstructed object (e.g., the circle 1616B) to be selected. Accordingly, the circle 1616B is depicted with a first visual indication in 1632 in the editing region 1601G. Further, the representation of the circle 1622 is depicted with the first visual indication 1628 in the selection component. As shown, the visual indication 1628 differs from the visual presentation of the second visual indication 1632, and the visual indication 1632 differs from the visual indication 1634 to indicate that selection of the circle is not associated with temporary selection criteria.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

What is claimed is:

1. A method, comprising:
 at an electronic device in communication with a display:
  receiving a slideshow comprising a first slide and a second slide, wherein the first slide comprises a first playable media item, and the second slide comprises a second playable media item;
  in accordance with a determination that the first playable media item and the second playable item correspond to a same media item, modifying a presentation of the second playable media item during playback such that the same media item is played continuously during presentation of the first slide and the second slide.

2. The method of claim 1, wherein the slideshow comprises a third slide and a fourth slide, wherein the third slide comprises a third playable media item, and the fourth slide comprises a fourth playable media item, and wherein the method further comprises:
 in accordance with a determination that the third playable media item and the fourth playable item correspond to different media items, forgoing modification of the presentation of the fourth playable media item during playback.

3. The method of claim 1, wherein a presentation characteristic of the first playable media item is different than a presentation characteristic of the second playable media item.

4. The method of claim 3, further comprising modifying presentation of the first playable media item or the second playable media item to generate transition frames of the same media item corresponding to a transition between the presentation characteristic of the first playable media item and the presentation characteristic of the second playable media item.

5. The method of claim 1, further comprising:
   after initiating playback of the first slide, determining whether the first playable media item and the second playable item correspond to a same media item.

6. The method of claim 1, wherein modifying the presentation of the second playable media item during playback causes the second playable media item to not be played during playback of the presentation, and wherein the method further comprises:
   modifying playback of the first playable media item based on a characteristic of the second playable media item.

7. The method of claim 1, wherein the slideshow includes a transition operation including an animation from the first slide to the second slide, wherein the same media item is integrated into the animation and played during the animation.

8. The method of claim 1, further comprising:
   in accordance with a determination that the same media item concludes during presentation of a third slide that does not contain a playable media item corresponding to the same media item, modify the playback of the same video such that a fade operation is applied to the same media item until the same media item ceases to be presented on the third slide.

9. The method of claim 1, wherein the determination that the first media item and the second media item correspond to the same video is based on a comparison of at least one video file characteristic selected from a group consisting of a file name, a video length, and a video file hash.

10. A non-transitory computer-readable storage medium storing one or more programs configured to be executed by one or more processors of an electronic device with a display, the one or more programs including instructions to:
    receive a slideshow comprising a first slide and a second slide, wherein the first slide comprises a first playable media item, and the second slide comprises a second playable media item;
    in accordance with a determination that the first playable media item and the second playable item correspond to a same media item, modify a presentation of the second playable media item during playback such that the same media item is played continuously during presentation of the first slide and the second slide.

11. The non-transitory computer readable medium of claim 10, wherein the slideshow comprises a third slide and a fourth slide, wherein the third slide comprises a third playable media item, and the fourth slide comprises a fourth playable media item, and further comprising instructions to:
    in accordance with a determination that the third playable media item and the fourth playable item correspond to different media items, forgo modification of the presentation of the fourth playable media item during playback.

12. The non-transitory computer readable medium of claim 10, wherein a presentation characteristic of the first playable media item is different than a presentation characteristic of the second playable media item.

13. The non-transitory computer readable medium of claim 12, further comprising instructions to modify presentation of the first playable media item or the second playable media item to generate transition frames of the same media item corresponding to a transition between the presentation characteristic of the first playable media item and the presentation characteristic of the second playable media item.

14. The non-transitory computer readable medium of claim 10, further comprising instructions to:
    after initiating playback of the first slide, determine whether the first playable media item and the second playable item correspond to a same media item.

15. The non-transitory computer readable medium of claim 10, wherein the instructions to modify the presentation of the second playable media item during playback causes the second playable media item to not be played during playback of the presentation, and further comprising instructions to:
    modify playback of the first playable media item based on a characteristic of the second playable media item.

16. The non-transitory computer readable medium of claim 10, wherein the slideshow includes a transition operation including an animation from the first slide to the second slide, wherein the same media item is integrated into the animation and played during the animation.

17. The non-transitory computer readable medium of claim 10, further comprising instructions to:
    in accordance with a determination that the same media item concludes during presentation of a third slide that does not contain a playable media item corresponding to the same media item, modify the playback of the same video such that a fade operation is applied to the same media item until the same media item ceases to be presented on the third slide.

18. The non-transitory computer readable medium of claim 10, wherein the determination that the first media item and the second media item correspond to the same video is based on a comparison of at least one video file characteristic selected from a group consisting of a file name, a video length, and a video file hash.

19. An electronic device, comprising:
    a display;
    one or more input devices;
    one or more processors; and
    memory storing one or more programs configured to be executed by the one or more processors, the one or more programs including instructions to:
        receive a slideshow comprising a first slide and a second slide, wherein the first slide comprises a first playable media item, and the second slide comprises a second playable media item;
        in accordance with a determination that the first playable media item and the second playable item correspond to a same media item, modify a presentation of the second playable media item during playback such that the same media item is played continuously during presentation of the first slide and the second slide.

20. The electronic device of claim 19, wherein the slideshow comprises a third slide and a fourth slide, wherein the third slide comprises a third playable media item, and the fourth slide comprises a fourth playable media item, and further comprising instructions to:
    in accordance with a determination that the third playable media item and the fourth playable item correspond to different media items, forgo modification of the presentation of the fourth playable media item during playback.

* * * * *